US010097616B2

(12) United States Patent
Walker et al.

(10) Patent No.: US 10,097,616 B2
(45) Date of Patent: Oct. 9, 2018

(54) METHODS FOR OPTIMIZING SERVICE OF CONTENT REQUESTS AND DEVICES THEREOF

(71) Applicant: F5 Networks, Inc., Seattle, WA (US)

(72) Inventors: Anthony Walker, Seattle, WA (US); Michael Bellhart, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 530 days.

(21) Appl. No.: 13/872,780

(22) Filed: Apr. 29, 2013

(65) Prior Publication Data

US 2014/0143375 A1     May 22, 2014

Related U.S. Application Data

(60) Provisional application No. 61/639,120, filed on Apr. 27, 2012.

(51) Int. Cl.
| | |
|---|---|
| *G06F 15/16* | (2006.01) |
| *H04L 29/08* | (2006.01) |
| *H04L 29/06* | (2006.01) |

(52) U.S. Cl.
CPC ............. *H04L 67/10* (2013.01); *H04L 67/06* (2013.01); *H04L 67/1031* (2013.01); *H04L 67/2814* (2013.01); *H04L 69/14* (2013.01)

(58) Field of Classification Search
CPC ................................ H04L 67/10; H04L 67/06
USPC ................................. 709/217, 218, 219, 238
See application file for complete search history.

(56) References Cited

U.S. PATENT DOCUMENTS

| | | |
|---|---|---|
| 3,950,735 A | 4/1976 | Patel |
| 4,644,532 A | 2/1987 | George et al. |
| 4,897,781 A | 1/1990 | Chang et al. |
| 4,965,772 A | 10/1990 | Daniel et al. |
| 5,023,826 A | 6/1991 | Patel |
| 5,053,953 A | 10/1991 | Patel |
| 5,167,024 A | 11/1992 | Smith et al. |
| 5,282,201 A | 1/1994 | Frank et al. |

(Continued)

FOREIGN PATENT DOCUMENTS

| | | |
|---|---|---|
| CA | 2080530 A1 | 4/1994 |
| EP | 0605088 A3 | 2/1996 |

(Continued)

OTHER PUBLICATIONS

"A Process for Selective Routing of Servlet Content to Transcoding Modules," Research Disclosure 422124, Jun. 1999, pp. 889-890, IBM Corporation.

(Continued)

*Primary Examiner* — Joseph E Avellino
*Assistant Examiner* — Marshall McLeod
(74) *Attorney, Agent, or Firm* — LeClairRyan PLLC (57) ABSTRACT

A method, non-transitory computer readable medium, and network traffic management apparatus that receives a request for content from a client computing device. A length of the content is determined. A plurality of requests for a portion of the length of the content is sent to a plurality of server computing devices, wherein the portion of the length of the content is specified as a byte range in a range header of each of the plurality of requests. A plurality of responses to the plurality of requests is received. At least a subset of the plurality of responses is output to the client computing device.

24 Claims, 3 Drawing Sheets

(56) References Cited

U.S. PATENT DOCUMENTS

| | | |
|---|---|---|
| 5,299,312 A | 3/1994 | Rocco, Jr. |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,550,816 A | 8/1996 | Hardwick et al. |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,623,490 A | 4/1997 | Richter et al. |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,793,302 A | 8/1998 | Stambler |
| 5,802,052 A | 9/1998 | Venkataraman |
| 5,812,550 A | 9/1998 | Sohn et al. |
| 5,825,772 A | 10/1998 | Dobbins et al. |
| 5,832,283 A | 11/1998 | Chou et al. |
| 5,862,326 A | 1/1999 | Bapat |
| 5,875,296 A | 2/1999 | Shi et al. |
| 5,892,914 A | 4/1999 | Pitts |
| 5,892,932 A | 4/1999 | Kim |
| 5,905,872 A | 5/1999 | DeSimone et al. |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,148 A | 10/1999 | Stambler |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 5,991,302 A | 11/1999 | Berl et al. |
| 5,995,491 A | 11/1999 | Richter et al. |
| 6,006,260 A | 12/1999 | Barrick, Jr. et al. |
| 6,006,264 A | 12/1999 | Colby et al. |
| 6,026,452 A | 2/2000 | Pitts |
| 6,026,500 A | 2/2000 | Topff et al. |
| 6,028,857 A | 2/2000 | Poor |
| 6,029,175 A | 2/2000 | Chow et al. |
| 6,041,365 A | 3/2000 | Kleinerman |
| 6,046,979 A | 4/2000 | Bauman |
| 6,047,356 A | 4/2000 | Anderson et al. |
| 6,051,169 A | 4/2000 | Brown et al. |
| 6,067,558 A | 5/2000 | Wendt et al. |
| 6,078,956 A | 6/2000 | Bryant et al. |
| 6,085,234 A | 7/2000 | Pitts et al. |
| 6,092,196 A | 7/2000 | Reiche |
| 6,104,706 A | 8/2000 | Richter et al. |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,154,777 A | 11/2000 | Ebrahim |
| 6,157,950 A | 12/2000 | Krishnan |
| 6,160,874 A | 12/2000 | Dickerman et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,259,405 B1 | 7/2001 | Stewart et al. |
| 6,260,070 B1 | 7/2001 | Shah |
| 6,263,368 B1 | 7/2001 | Martin |
| 6,289,012 B1 | 9/2001 | Harrington et al. |
| 6,292,832 B1 | 9/2001 | Shah et al. |
| 6,298,380 B1 | 10/2001 | Coile et al. |
| 6,304,913 B1 | 10/2001 | Rune |
| 6,311,278 B1 | 10/2001 | Raanan et al. |
| 6,327,622 B1 | 12/2001 | Jindal et al. |
| 6,330,574 B1 | 12/2001 | Murashita |
| 6,336,147 B1 | 1/2002 | Brownell et al. |
| 6,338,082 B1 | 1/2002 | Schneider |
| 6,343,324 B1 | 1/2002 | Hubis et al. |
| 6,347,339 B1 | 2/2002 | Morris et al. |
| 6,353,848 B1 | 3/2002 | Morris |
| 6,360,270 B1 | 3/2002 | Cherkasova et al. |
| 6,363,056 B1 | 3/2002 | Beigi et al. |
| 6,370,527 B1 | 4/2002 | Singhal |
| 6,374,300 B2 | 4/2002 | Masters |
| 6,389,462 B1 | 5/2002 | Cohen et al. |
| 6,396,833 B1 | 5/2002 | Zhang et al. |
| 6,411,986 B1 | 6/2002 | Susai et al. |
| 6,430,562 B1 | 8/2002 | Kardos et al. |
| 6,434,081 B1 | 8/2002 | Johnson et al. |
| 6,446,108 B1 | 9/2002 | Rosenberg et al. |
| 6,466,580 B1 | 10/2002 | Leung |
| 6,469,983 B2 | 10/2002 | Narayana et al. |
| 6,480,476 B1 | 11/2002 | Willars |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,513,061 B1 | 1/2003 | Ebata et al. |
| 6,514,085 B2 | 2/2003 | Slattery et al. |
| 6,519,643 B1 | 2/2003 | Foulkes et al. |
| 6,542,936 B1 | 4/2003 | Mayle et al. |
| 6,560,230 B1 | 5/2003 | Li et al. |
| 6,578,069 B1 | 6/2003 | Hopmann et al. |
| 6,601,084 B1 | 7/2003 | Bhaskaran et al. |
| 6,615,267 B1 | 9/2003 | Whalen et al. |
| 6,631,422 B1 | 10/2003 | Althaus et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,346 B1 | 11/2003 | Mahalingaiah et al. |
| 6,654,701 B2 | 11/2003 | Hatley |
| 6,661,802 B1 | 12/2003 | Homberg et al. |
| 6,683,873 B1 | 1/2004 | Kwok et al. |
| 6,691,165 B1 | 2/2004 | Bruck et al. |
| 6,694,517 B1 | 2/2004 | James et al. |
| 6,701,415 B1 | 3/2004 | Hendren, III |
| 6,708,187 B1 | 3/2004 | Shanumgam et al. |
| 6,708,220 B1 | 3/2004 | Olin |
| 6,718,380 B1 | 4/2004 | Mohaban et al. |
| 6,728,704 B2 | 4/2004 | Mao et al. |
| 6,738,357 B1 | 5/2004 | Richter et al. |
| 6,742,045 B1 | 5/2004 | Albert et al. |
| 6,744,776 B1 | 6/2004 | Kalkunte et al. |
| 6,751,663 B1 | 6/2004 | Farrell et al. |
| 6,754,215 B1 | 6/2004 | Arikawa et al. |
| 6,754,228 B1 | 6/2004 | Ludwig |
| 6,754,699 B2 | 6/2004 | Swildens et al. |
| 6,760,337 B1 | 7/2004 | Snyder, II et al. |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,795,860 B1 | 9/2004 | Shah |
| 6,798,777 B1 | 9/2004 | Ferguson et al. |
| 6,804,542 B1 | 10/2004 | Haartsen |
| 6,816,901 B1 | 11/2004 | Sitaraman et al. |
| 6,816,977 B2 | 11/2004 | Brakmo et al. |
| 6,826,698 B1 | 11/2004 | Minkin et al. |
| 6,829,238 B2 | 12/2004 | Tokuyo et al. |
| 6,829,649 B1 | 12/2004 | Shorey et al. |
| 6,857,009 B1 | 2/2005 | Ferreria |
| 6,862,282 B1 | 3/2005 | Oden |

(56) References Cited

U.S. PATENT DOCUMENTS

| | | |
|---|---|---|
| 6,865,593 B1 | 3/2005 | Reshef et al. |
| 6,868,082 B1 | 3/2005 | Allen, Jr. et al. |
| 6,868,447 B1 | 3/2005 | Slaughter et al. |
| 6,871,221 B1 | 3/2005 | Styles |
| 6,876,629 B2 | 4/2005 | Beshai et al. |
| 6,876,654 B1 | 4/2005 | Hegde |
| 6,880,017 B1 | 4/2005 | Marce et al. |
| 6,883,137 B1 | 4/2005 | Girardot et al. |
| 6,888,836 B1 | 5/2005 | Cherkasova |
| 6,904,040 B2 | 6/2005 | Salapura et al. |
| 6,914,881 B1 | 7/2005 | Mansfield et al. |
| 6,928,082 B2 | 8/2005 | Liu et al. |
| 6,928,518 B2 | 8/2005 | Talagala |
| 6,947,985 B2 | 9/2005 | Hegli |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,959,394 B1 | 10/2005 | Brickell et al. |
| 6,970,475 B1 | 11/2005 | Fraser et al. |
| 6,970,924 B1 | 11/2005 | Chu et al. |
| 6,973,490 B1 | 12/2005 | Robertson et al. |
| 6,975,592 B1 | 12/2005 | Seddigh et al. |
| 6,986,040 B1 | 1/2006 | Kramer et al. |
| 6,987,763 B2 | 1/2006 | Rochberger et al. |
| 6,990,074 B2 | 1/2006 | Wan et al. |
| 6,990,114 B1 | 1/2006 | Erimli et al. |
| 7,003,564 B2 | 2/2006 | Greuel et al. |
| 7,006,502 B2 | 2/2006 | Lin |
| 7,007,092 B2 | 2/2006 | Peiffer |
| 7,020,713 B1 | 3/2006 | Shah et al. |
| 7,023,974 B1 | 4/2006 | Brannam et al. |
| 7,035,212 B1 | 4/2006 | Mittal et al. |
| 7,039,061 B2 | 5/2006 | Connor et al. |
| 7,058,633 B1 | 6/2006 | Gnagy et al. |
| 7,065,482 B2 | 6/2006 | Shorey et al. |
| 7,075,924 B2 | 7/2006 | Richter et al. |
| 7,076,689 B2 | 7/2006 | Atkinson |
| 7,080,314 B1 | 7/2006 | Garofalakis et al. |
| 7,089,491 B2 | 8/2006 | Feinberg et al. |
| 7,113,993 B1 | 9/2006 | Cappiello et al. |
| 7,113,996 B2 | 9/2006 | Kronenberg |
| 7,120,666 B2 | 10/2006 | McCanne et al. |
| 7,133,863 B2 | 11/2006 | Teng et al. |
| 7,133,944 B2 | 11/2006 | Song et al. |
| 7,139,792 B1 | 11/2006 | Mishra et al. |
| 7,155,722 B1 | 12/2006 | Hilla et al. |
| 7,161,904 B2 | 1/2007 | Hussain et al. |
| 7,185,359 B2 | 2/2007 | Schmidt et al. |
| 7,191,163 B2 | 3/2007 | Herrera et al. |
| 7,206,282 B1 | 4/2007 | Goldman et al. |
| 7,228,359 B1 | 6/2007 | Monteiro |
| 7,228,422 B2 | 6/2007 | Morioka et al. |
| 7,236,491 B2 | 6/2007 | Tsao et al. |
| 7,240,100 B1 | 7/2007 | Wein et al. |
| 7,257,633 B2 | 8/2007 | Masputra et al. |
| 7,283,470 B1 | 10/2007 | Sindhu et al. |
| 7,287,082 B1 | 10/2007 | O'Toole, Jr. |
| 7,292,541 B1 | 11/2007 | CS |
| 7,295,827 B2 | 11/2007 | Liu et al. |
| 7,296,263 B1 | 11/2007 | Jacob |
| 7,308,475 B1 | 12/2007 | Pruitt et al. |
| 7,308,703 B2 | 12/2007 | Wright et al. |
| 7,308,709 B1 | 12/2007 | Brezak et al. |
| 7,310,339 B1 | 12/2007 | Powers et al. |
| 7,319,696 B2 | 1/2008 | Inoue et al. |
| 7,321,926 B1 | 1/2008 | Zhang et al. |
| 7,324,533 B1 | 1/2008 | DeLiberato et al. |
| 7,333,999 B1 | 2/2008 | Njemanze |
| 7,340,571 B2 | 3/2008 | Saze |
| 7,343,413 B2 | 3/2008 | Gilde et al. |
| 7,349,391 B2 | 3/2008 | Ben-Dor et al. |
| 7,373,438 B1 | 5/2008 | DeBergalis et al. |
| 7,383,570 B2 | 6/2008 | Pinkas et al. |
| 7,398,552 B2 | 7/2008 | Pardee et al. |
| 7,409,440 B1 | 8/2008 | Jacob |
| 7,433,962 B2 | 10/2008 | Janssen et al. |
| 7,437,478 B2 | 10/2008 | Yokota et al. |
| 7,454,480 B2 | 11/2008 | Labio et al. |
| 7,490,162 B1 | 2/2009 | Masters |
| 7,500,243 B2 | 3/2009 | Huetsch et al. |
| 7,500,269 B2 | 3/2009 | Huotari et al. |
| 7,505,795 B1 | 3/2009 | Lim et al. |
| 7,516,492 B1 | 4/2009 | Nisbet et al. |
| 7,522,581 B2 | 4/2009 | Acharya et al. |
| 7,526,541 B2 | 4/2009 | Roese et al. |
| 7,555,608 B2 | 6/2009 | Naik et al. |
| 7,558,197 B1 | 7/2009 | Sindhu et al. |
| 7,577,723 B2 | 8/2009 | Matsuda et al. |
| 7,580,971 B1 | 8/2009 | Gollapudi et al. |
| 7,590,732 B2 | 9/2009 | Rune |
| 7,624,424 B2 | 11/2009 | Morita et al. |
| 7,640,347 B1 | 12/2009 | Sloat et al. |
| 7,644,137 B2 | 1/2010 | Bozak et al. |
| 7,668,166 B1 | 2/2010 | Rekhter et al. |
| 7,680,915 B2 | 3/2010 | Still et al. |
| 7,684,423 B2 | 3/2010 | Tripathi et al. |
| 7,689,710 B2 | 3/2010 | Tang et al. |
| 7,698,458 B1 | 4/2010 | Liu et al. |
| 7,706,261 B2 | 4/2010 | Sun et al. |
| 7,724,657 B2 | 5/2010 | Rao et al. |
| 7,725,093 B2 | 5/2010 | Sengupta et al. |
| 7,778,187 B2 | 8/2010 | Chaturvedi et al. |
| 7,801,978 B1 | 9/2010 | Susai et al. |
| 7,808,913 B2 | 10/2010 | Ansari et al. |
| 7,822,839 B1 | 10/2010 | Pruitt et al. |
| 7,831,662 B2 | 11/2010 | Clark et al. |
| 7,861,085 B1 | 12/2010 | Case et al. |
| 7,876,677 B2 | 1/2011 | Cheshire |
| 7,895,653 B2 | 2/2011 | Calo et al. |
| 7,903,554 B1 | 3/2011 | Manur et al. |
| 7,908,245 B2 | 3/2011 | Nakano et al. |
| 7,908,314 B2 | 3/2011 | Yamaguchi et al. |
| 7,925,908 B2 | 4/2011 | Kim |
| 7,930,365 B2 | 4/2011 | Dixit et al. |
| 7,933,496 B2 | 4/2011 | Livshits et al. |
| 7,933,946 B2 | 4/2011 | Livshits et al. |
| 7,945,908 B1 | 5/2011 | Waldspurger et al. |
| 7,958,222 B1 | 6/2011 | Pruitt et al. |
| 7,984,141 B2 | 7/2011 | Gupta et al. |
| 7,984,500 B1 | 7/2011 | Khanna et al. |
| 8,024,443 B1 | 9/2011 | Jacob |
| 8,037,528 B2 | 10/2011 | Williams et al. |
| 8,041,022 B1 | 10/2011 | Andreasen et al. |
| 8,064,342 B2 | 11/2011 | Badger |
| 8,069,225 B2 | 11/2011 | McCanne et al. |
| 8,103,781 B1 | 1/2012 | Wu et al. |
| 8,130,650 B2 | 3/2012 | Allen, Jr. et al. |
| 8,149,819 B2 | 4/2012 | Kobayashi et al. |
| 8,155,128 B2 | 4/2012 | Balyan et al. |
| 8,171,124 B2 | 5/2012 | Kondamuru |
| 8,189,567 B2 | 5/2012 | Kavanagh et al. |
| 8,190,769 B1 | 5/2012 | Shukla et al. |
| 8,199,757 B2 | 6/2012 | Pani et al. |
| 8,205,246 B2 | 6/2012 | Shatzkamer et al. |
| 8,239,954 B2 | 8/2012 | Wobber et al. |
| 8,271,620 B2 | 9/2012 | Witchey |
| 8,274,895 B2 | 9/2012 | Rahman et al. |
| 8,321,908 B2 | 11/2012 | Gai et al. |
| 8,351,333 B2 | 1/2013 | Rao et al. |
| 8,380,854 B2 | 2/2013 | Szabo |
| 8,396,836 B1 | 3/2013 | Ferguson et al. |
| 8,417,817 B1 | 4/2013 | Jacobs |
| 8,447,871 B1 | 5/2013 | Szabo |
| 8,447,970 B2 | 5/2013 | Klein et al. |
| 8,452,876 B1 | 5/2013 | Williams et al. |
| 8,463,850 B1 | 6/2013 | McCann |
| 8,464,265 B2 | 6/2013 | Worley |
| 8,468,247 B1 | 6/2013 | Richardson et al. |
| 8,468,267 B2 | 6/2013 | Yigang |
| 8,521,851 B1 | 8/2013 | Richardson et al. |
| 8,521,880 B1 | 8/2013 | Richardson et al. |
| 8,359,224 B2 | 9/2013 | Henderson et al. |
| 8,539,224 B2 | 9/2013 | Henderson et al. |
| 8,560,693 B1 | 10/2013 | Wang et al. |

(56) References Cited

U.S. PATENT DOCUMENTS

| | | | |
|---|---|---|---|
| 8,566,474 B2 | 10/2013 | Kanode et al. | |
| 8,578,050 B2 | 11/2013 | Craig et al. | |
| 8,601,000 B1 | 12/2013 | Stefani et al. | |
| 8,606,921 B2 | 12/2013 | Vasquez et al. | |
| 8,615,022 B2 | 12/2013 | Harrison et al. | |
| 8,646,067 B2 | 2/2014 | Agarwal et al. | |
| 8,665,868 B2 | 3/2014 | Kay | |
| 8,665,969 B2 | 3/2014 | Kay | |
| 8,701,179 B1 | 4/2014 | Penno et al. | |
| 8,725,836 B2 | 5/2014 | Lowery et al. | |
| 8,726,338 B2 | 5/2014 | Narayanaswamy et al. | |
| 8,737,304 B2 | 5/2014 | Karuturi et al. | |
| 8,778,665 B2 | 7/2014 | Glide et al. | |
| 8,804,504 B1 | 8/2014 | Chen | |
| 8,819,109 B1 | 8/2014 | Krishnamurthy et al. | |
| 8,819,419 B2 | 8/2014 | Carlson et al. | |
| 8,819,768 B1 | 8/2014 | Koeten et al. | |
| 8,830,874 B2 | 9/2014 | Cho et al. | |
| 8,838,817 B1 | 9/2014 | Biswas | |
| 8,873,753 B2 | 10/2014 | Parker | |
| 8,875,274 B2 | 10/2014 | Montemurro et al. | |
| 8,879,431 B2 | 11/2014 | Ridel et al. | |
| 8,886,981 B1 | 11/2014 | Baumann et al. | |
| 8,908,545 B1 | 12/2014 | Chen et al. | |
| 8,954,080 B2 | 2/2015 | Janakiraman et al. | |
| 8,954,492 B1 | 2/2015 | Lowell, Jr. | |
| 8,959,215 B2 | 2/2015 | Koponen et al. | |
| 9,036,529 B2 | 5/2015 | Erickson et al. | |
| 9,037,166 B2 | 5/2015 | de Wit et al. | |
| 9,047,259 B1 | 6/2015 | Ho et al. | |
| 9,077,554 B1 | 7/2015 | Szabo | |
| 9,083,760 B1 | 7/2015 | Hughes et al. | |
| 9,137,301 B1 * | 9/2015 | Dunlap | H04L 67/101 |
| 9,143,451 B2 | 9/2015 | Amdahl et al. | |
| 9,244,843 B1 | 1/2016 | Michels et al. | |
| 9,497,614 B1 | 11/2016 | Ridel et al. | |
| 2001/0000083 A1 | 3/2001 | Crow | |
| 2001/0007560 A1 | 7/2001 | Masuda et al. | |
| 2001/0009554 A1 | 7/2001 | Katseff et al. | |
| 2001/0023442 A1 | 9/2001 | Masters | |
| 2002/0010757 A1 | 1/2002 | Granik et al. | |
| 2002/0010783 A1 | 1/2002 | Primak et al. | |
| 2002/0012352 A1 | 1/2002 | Hansson et al. | |
| 2002/0032758 A1 | 1/2002 | Yen et al. | |
| 2002/0032777 A1 | 3/2002 | Kawata | |
| 2002/0038360 A1 | 3/2002 | Andrews et al. | |
| 2002/0046291 A1 | 4/2002 | O'Callaghan et al. | |
| 2002/0049842 A1 | 4/2002 | Huetsch et al. | |
| 2002/0059428 A1 | 5/2002 | Susai et al. | |
| 2002/0065848 A1 | 5/2002 | Walker et al. | |
| 2002/0072048 A1 | 6/2002 | Slattery et al. | |
| 2002/0083067 A1 | 6/2002 | Tamayo et al. | |
| 2002/0087571 A1 | 7/2002 | Stapel et al. | |
| 2002/0087744 A1 | 7/2002 | Kitchin | |
| 2002/0095498 A1 | 7/2002 | Chanda et al. | |
| 2002/0099829 A1 | 7/2002 | Richards et al. | |
| 2002/0099842 A1 | 7/2002 | Jennings et al. | |
| 2002/0103823 A1 | 8/2002 | Jackson et al. | |
| 2002/0112061 A1 | 8/2002 | Shih et al. | |
| 2002/0138615 A1 | 9/2002 | Schmeling | |
| 2002/0143819 A1 | 10/2002 | Han et al. | |
| 2002/0143852 A1 | 10/2002 | Guo et al. | |
| 2002/0161913 A1 | 10/2002 | Gonzalez et al. | |
| 2002/0162118 A1 | 10/2002 | Levy et al. | |
| 2002/0174216 A1 | 11/2002 | Shorey et al. | |
| 2002/0188753 A1 | 12/2002 | Tang et al. | |
| 2002/0194112 A1 | 12/2002 | DePinto et al. | |
| 2002/0194342 A1 | 12/2002 | Lu et al. | |
| 2002/0198956 A1 | 12/2002 | Dunshea et al. | |
| 2002/0198993 A1 | 12/2002 | Cudd et al. | |
| 2003/0005144 A1 | 1/2003 | Engel et al. | |
| 2003/0005172 A1 | 1/2003 | Chessell | |
| 2003/0009528 A1 | 1/2003 | Sharif et al. | |
| 2003/0018450 A1 | 1/2003 | Carley | |
| 2003/0018585 A1 | 1/2003 | Butler et al. | |
| 2003/0018927 A1 | 2/2003 | Gadir et al. |
| 2003/0034905 A1 | 2/2003 | Anton et al. |
| 2003/0037070 A1 | 2/2003 | Marston |
| 2003/0046291 A1 | 3/2003 | Fascenda |
| 2003/0046335 A1 | 3/2003 | Doyle et al. |
| 2003/0051045 A1 | 3/2003 | Connor |
| 2003/0055723 A1 | 3/2003 | English |
| 2003/0065653 A1 | 4/2003 | Overton et al. |
| 2003/0065951 A1 | 4/2003 | Igeta et al. |
| 2003/0069918 A1 | 4/2003 | Lu et al. |
| 2003/0069974 A1 | 4/2003 | Lu et al. |
| 2003/0070069 A1 | 4/2003 | Belapurkar et al. |
| 2003/0074301 A1 | 4/2003 | Solomon |
| 2003/0086415 A1 | 5/2003 | Bernhard et al. |
| 2003/0105807 A1 | 6/2003 | Thompson et al. |
| 2003/0105846 A1 | 6/2003 | Zhao et al. |
| 2003/0105983 A1 | 6/2003 | Brakmo et al. |
| 2003/0108000 A1 | 6/2003 | Chaney et al. |
| 2003/0108002 A1 | 6/2003 | Chaney et al. |
| 2003/0108052 A1 | 6/2003 | Inoue |
| 2003/0120948 A1 | 6/2003 | Schmidt et al. |
| 2003/0128708 A1 | 7/2003 | Inoue et al. |
| 2003/0130945 A1 | 7/2003 | Force |
| 2003/0131052 A1 | 7/2003 | Allan |
| 2003/0139934 A1 | 7/2003 | Mandera |
| 2003/0145062 A1 | 7/2003 | Sharma et al. |
| 2003/0145233 A1 | 7/2003 | Poletto et al. |
| 2003/0156586 A1 | 8/2003 | Lee et al. |
| 2003/0163576 A1 | 8/2003 | Janssen et al. |
| 2003/0179755 A1 | 9/2003 | Fraser |
| 2003/0189936 A1 | 10/2003 | Terrell et al. |
| 2003/0191812 A1 | 10/2003 | Agarwalla et al. |
| 2003/0195813 A1 | 10/2003 | Pallister et al. |
| 2003/0195962 A1 | 10/2003 | Kikuchi et al. |
| 2003/0208596 A1 | 11/2003 | Carolan et al. |
| 2003/0212954 A1 | 11/2003 | Patrudu |
| 2003/0220835 A1 | 11/2003 | Barnes, Jr. |
| 2003/0225485 A1 | 12/2003 | Fritz et al. |
| 2003/0229665 A1 | 12/2003 | Ryman |
| 2003/0236995 A1 | 12/2003 | Fretwell, Jr. |
| 2004/0003287 A1 | 1/2004 | Zissimopoulos et al. |
| 2004/0006591 A1 | 1/2004 | Matsui et al. |
| 2004/0015783 A1 | 1/2004 | Lennon et al. |
| 2004/0017825 A1 | 1/2004 | Stanwood et al. |
| 2004/0030627 A1 | 2/2004 | Sedukhin |
| 2004/0030740 A1 | 2/2004 | Stetting |
| 2004/0043758 A1 | 3/2004 | Sorvari et al. |
| 2004/0059789 A1 | 3/2004 | Shum |
| 2004/0064544 A1 | 4/2004 | Barsness et al. |
| 2004/0064554 A1 | 4/2004 | Kuno et al. |
| 2004/0072569 A1 | 4/2004 | Omae et al. |
| 2004/0093361 A1 | 5/2004 | Therrien |
| 2004/0103206 A1 | 5/2004 | Hsu et al. |
| 2004/0103283 A1 | 5/2004 | Hornak |
| 2004/0111523 A1 | 6/2004 | Hall et al. |
| 2004/0111621 A1 | 6/2004 | Himberger et al. |
| 2004/0117493 A1 | 6/2004 | Bazot et al. |
| 2004/0122926 A1 | 6/2004 | Moore et al. |
| 2004/0123277 A1 | 6/2004 | Schrader et al. |
| 2004/0133605 A1 | 7/2004 | Chang et al. |
| 2004/0138858 A1 | 7/2004 | Carley |
| 2004/0141185 A1 | 8/2004 | Akama |
| 2004/0151186 A1 | 8/2004 | Akama |
| 2004/0167967 A1 | 8/2004 | Bastian et al. |
| 2004/0177165 A1 | 9/2004 | Masputra et al. |
| 2004/0192312 A1 | 9/2004 | Li et al. |
| 2004/0199762 A1 | 10/2004 | Carlson et al. |
| 2004/0210663 A1 | 10/2004 | Phillips et al. |
| 2004/0213156 A1 | 10/2004 | Smallwood et al. |
| 2004/0215665 A1 | 10/2004 | Edgar et al. |
| 2004/0215746 A1 | 10/2004 | McCanne et al. |
| 2004/0236826 A1 | 11/2004 | Harville et al. |
| 2004/0243703 A1 | 12/2004 | Demmer et al. |
| 2004/0255000 A1 | 12/2004 | Simionescu et al. |
| 2004/0260745 A1 | 12/2004 | Gage et al. |
| 2004/0264472 A1 | 12/2004 | Oliver et al. |
| 2004/0264481 A1 | 12/2004 | Darling et al. |
| 2004/0267920 A1 | 12/2004 | Hydrie et al. |
| 2004/0267948 A1 | 12/2004 | Oliver et al. |

(56) References Cited

U.S. PATENT DOCUMENTS

| | | |
|---|---|---|
| 2004/0268358 A1 | 12/2004 | Darling et al. |
| 2005/0004887 A1 | 1/2005 | Igakura et al. |
| 2005/0008017 A1 | 1/2005 | Datta et al. |
| 2005/0021703 A1 | 1/2005 | Cherry et al. |
| 2005/0021736 A1 | 1/2005 | Carusi et al. |
| 2005/0027841 A1 | 2/2005 | Rolfe |
| 2005/0027869 A1 | 2/2005 | Johnson |
| 2005/0044158 A1 | 2/2005 | Malik |
| 2005/0044213 A1 | 2/2005 | Kobayashi et al. |
| 2005/0052440 A1 | 3/2005 | Kim et al. |
| 2005/0055435 A1 | 3/2005 | Gbadegesin et al. |
| 2005/0071283 A1 | 3/2005 | Randle et al. |
| 2005/0078604 A1 | 4/2005 | Yim |
| 2005/0117589 A1 | 6/2005 | Douady et al. |
| 2005/0122942 A1 | 6/2005 | Rhee et al. |
| 2005/0122977 A1 | 6/2005 | Lieberman |
| 2005/0125553 A1 | 6/2005 | Wu et al. |
| 2005/0154837 A1 | 7/2005 | Keohane et al. |
| 2005/0165656 A1 | 7/2005 | Frederick et al. |
| 2005/0174944 A1 | 8/2005 | Legault et al. |
| 2005/0175013 A1 | 8/2005 | Le Pennec et al. |
| 2005/0187866 A1 | 8/2005 | Lee |
| 2005/0188220 A1 | 8/2005 | Nilsson et al. |
| 2005/0198234 A1 | 9/2005 | Leib et al. |
| 2005/0198310 A1 | 9/2005 | Kim et al. |
| 2005/0213587 A1 | 9/2005 | Cho et al. |
| 2005/0234928 A1 | 10/2005 | Shkvarchuk et al. |
| 2005/0240664 A1 | 10/2005 | Chen et al. |
| 2005/0246393 A1 | 11/2005 | Coates et al. |
| 2005/0256806 A1 | 11/2005 | Tien et al. |
| 2005/0262238 A1 | 11/2005 | Reeves et al. |
| 2005/0273456 A1 | 12/2005 | Revanuru et al. |
| 2005/0273645 A1 | 12/2005 | Satran et al. |
| 2005/0273843 A1 | 12/2005 | Shigeeda |
| 2005/0288939 A1 | 12/2005 | Peled et al. |
| 2006/0031374 A1 | 2/2006 | Lu et al. |
| 2006/0031520 A1 | 2/2006 | Bedekar et al. |
| 2006/0031778 A1 | 2/2006 | Goodwin et al. |
| 2006/0036764 A1 | 2/2006 | Yokota et al. |
| 2006/0045089 A1 | 3/2006 | Sadler et al. |
| 2006/0045096 A1 | 3/2006 | Farmer et al. |
| 2006/0047785 A1 | 3/2006 | Wang et al. |
| 2006/0059267 A1 | 3/2006 | Cugi et al. |
| 2006/0077902 A1 | 4/2006 | Kannan et al. |
| 2006/0077986 A1 | 4/2006 | Rune |
| 2006/0083205 A1 | 4/2006 | Buddhikot et al. |
| 2006/0095573 A1 | 5/2006 | Carle et al. |
| 2006/0100752 A1 | 5/2006 | Kim et al. |
| 2006/0106802 A1 | 5/2006 | Giblin et al. |
| 2006/0112176 A1 | 5/2006 | Liu et al. |
| 2006/0112272 A1 | 5/2006 | Morioka et al. |
| 2006/0112367 A1 | 5/2006 | Harris |
| 2006/0123210 A1 | 6/2006 | Pritchett et al. |
| 2006/0129684 A1 | 6/2006 | Datta |
| 2006/0130133 A1 | 6/2006 | Andreev et al. |
| 2006/0133374 A1 | 6/2006 | Sekiguchi |
| 2006/0135198 A1 | 6/2006 | Lee |
| 2006/0140193 A1 | 6/2006 | Kakani et al. |
| 2006/0153201 A1 | 7/2006 | Hepper et al. |
| 2006/0156416 A1 | 7/2006 | Huotari et al. |
| 2006/0161577 A1 | 7/2006 | Kulkarni et al. |
| 2006/0168070 A1 | 7/2006 | Thompson et al. |
| 2006/0171365 A1 | 8/2006 | Borella |
| 2006/0179153 A1 | 8/2006 | Lee et al. |
| 2006/0182103 A1 | 8/2006 | Martini et al. |
| 2006/0184647 A1 | 8/2006 | Dixit et al. |
| 2006/0209669 A1 | 9/2006 | Nishio |
| 2006/0209853 A1 | 9/2006 | Hidaka et al. |
| 2006/0229861 A1 | 10/2006 | Tatsuoka et al. |
| 2006/0230148 A1 | 10/2006 | Forecast et al. |
| 2006/0233106 A1 | 10/2006 | Achlioptas et al. |
| 2006/0235998 A1 | 10/2006 | Stecher et al. |
| 2006/0242300 A1 | 10/2006 | Yumoto et al. |
| 2006/0248194 A1 | 11/2006 | Ly et al. |
| 2006/0259320 A1 | 11/2006 | LaSalle et al. |
| 2006/0268692 A1 | 11/2006 | Wright |
| 2006/0268704 A1 | 11/2006 | Ansari et al. |
| 2006/0270341 A1 | 11/2006 | Kim et al. |
| 2006/0282442 A1 | 12/2006 | Lennon et al. |
| 2006/0291483 A1 | 12/2006 | Sela |
| 2006/0294054 A1 | 12/2006 | Kudo et al. |
| 2007/0005807 A1 | 1/2007 | Wong |
| 2007/0006293 A1 | 1/2007 | Balakrishnan et al. |
| 2007/0016613 A1 | 1/2007 | Foresti et al. |
| 2007/0016662 A1 | 1/2007 | Desai et al. |
| 2007/0019636 A1 | 1/2007 | Lau |
| 2007/0019658 A1 | 1/2007 | Park et al. |
| 2007/0038994 A1 | 2/2007 | Davis et al. |
| 2007/0044060 A1 | 2/2007 | Waller |
| 2007/0050843 A1 | 3/2007 | Manville et al. |
| 2007/0058670 A1 | 3/2007 | Konduru et al. |
| 2007/0064661 A1 | 3/2007 | Sood et al. |
| 2007/0067373 A1 | 3/2007 | Higgins et al. |
| 2007/0067771 A1 | 3/2007 | Kulbak et al. |
| 2007/0083646 A1 | 4/2007 | Miller et al. |
| 2007/0088822 A1 | 4/2007 | Coile et al. |
| 2007/0104115 A1 | 5/2007 | Decasper et al. |
| 2007/0106796 A1 | 5/2007 | Kudo et al. |
| 2007/0107048 A1 | 5/2007 | Halls et al. |
| 2007/0112775 A1 | 5/2007 | Ackerman |
| 2007/0118879 A1 | 5/2007 | Yeun |
| 2007/0124415 A1 | 5/2007 | Lev-Ran et al. |
| 2007/0124502 A1 | 5/2007 | Li |
| 2007/0130255 A1 | 6/2007 | VVolovitz et al. |
| 2007/0147246 A1 | 6/2007 | Hurley et al. |
| 2007/0162891 A1 | 7/2007 | Bumer et al. |
| 2007/0168320 A1 | 7/2007 | Borthakur et al. |
| 2007/0168525 A1 | 7/2007 | DeLeon et al. |
| 2007/0174491 A1 | 7/2007 | Still et al. |
| 2007/0192543 A1 | 8/2007 | Naik et al. |
| 2007/0220598 A1 | 9/2007 | Salowey et al. |
| 2007/0233809 A1 | 10/2007 | Brownell et al. |
| 2007/0233826 A1 | 10/2007 | Tindal et al. |
| 2007/0250560 A1 | 10/2007 | Wein et al. |
| 2007/0258451 A1 | 11/2007 | Bouat |
| 2007/0283023 A1 | 12/2007 | Ly et al. |
| 2007/0288484 A1* | 12/2007 | Yan et al. ............ 707/10 |
| 2007/0297410 A1 | 12/2007 | Yoon et al. |
| 2007/0297551 A1 | 12/2007 | Choi |
| 2008/0004022 A1 | 1/2008 | Johannesson et al. |
| 2008/0008202 A1 | 1/2008 | Terrell et al. |
| 2008/0010372 A1 | 1/2008 | Khendouri et al. |
| 2008/0022059 A1 | 1/2008 | Zimmerer et al. |
| 2008/0025297 A1 | 1/2008 | Kashyap |
| 2008/0031258 A1 | 2/2008 | Acharya et al. |
| 2008/0034136 A1 | 2/2008 | Ulenas |
| 2008/0072303 A1 | 3/2008 | Syed |
| 2008/0120370 A1 | 5/2008 | Chan et al. |
| 2008/0120592 A1 | 5/2008 | Tanguay et al. |
| 2008/0133518 A1 | 6/2008 | Kapoor et al. |
| 2008/0133771 A1* | 6/2008 | Vardi ............ H04L 12/64 709/238 |
| 2008/0134311 A1 | 6/2008 | Medvinsky et al. |
| 2008/0141246 A1 | 6/2008 | Kuck et al. |
| 2008/0148340 A1 | 6/2008 | Powell et al. |
| 2008/0159145 A1 | 7/2008 | Muthukrishnan et al. |
| 2008/0165801 A1 | 7/2008 | Sheppard |
| 2008/0172488 A1* | 7/2008 | Jawahar ............ G06F 17/30902 709/225 |
| 2008/0178278 A1 | 7/2008 | Grinstein et al. |
| 2008/0201599 A1 | 8/2008 | Ferraiolo et al. |
| 2008/0205613 A1 | 8/2008 | Lopez |
| 2008/0208917 A1 | 8/2008 | Smoot et al. |
| 2008/0209524 A1 | 8/2008 | Almog |
| 2008/0222646 A1 | 9/2008 | Sigal et al. |
| 2008/0225710 A1 | 9/2008 | Raja et al. |
| 2008/0228911 A1 | 9/2008 | Mackey |
| 2008/0229025 A1 | 9/2008 | Plamondon |
| 2008/0229415 A1 | 9/2008 | Kapoor et al. |
| 2008/0235508 A1 | 9/2008 | Ran et al. |
| 2008/0239986 A1 | 10/2008 | Ku et al. |
| 2008/0253395 A1 | 10/2008 | Pandya |
| 2008/0256224 A1 | 10/2008 | Kaji et al. |
| 2008/0263401 A1 | 10/2008 | Stenzel |

(56) References Cited

U.S. PATENT DOCUMENTS

| | | |
|---|---|---|
| 2008/0270578 A1 | 10/2008 | Zhang et al. |
| 2008/0279200 A1 | 11/2008 | Shatzkamer et al. |
| 2008/0281908 A1 | 11/2008 | McCanne et al. |
| 2008/0281944 A1 | 11/2008 | Vome et al. |
| 2008/0282354 A1 | 11/2008 | Wobber et al. |
| 2008/0288661 A1 | 11/2008 | Galles |
| 2008/0301760 A1 | 12/2008 | Lim |
| 2008/0316922 A1 | 12/2008 | Riddle et al. |
| 2009/0028337 A1 | 1/2009 | Balabine et al. |
| 2009/0037998 A1 | 2/2009 | Adhya et al. |
| 2009/0049230 A1 | 2/2009 | Pandya |
| 2009/0070617 A1 | 3/2009 | Arimilli et al. |
| 2009/0077619 A1 | 3/2009 | Boyce |
| 2009/0080440 A1 | 3/2009 | Balyan et al. |
| 2009/0089487 A1 | 4/2009 | Kwon et al. |
| 2009/0094311 A1 | 4/2009 | Awadallah et al. |
| 2009/0094610 A1 | 4/2009 | Sukirya |
| 2009/0097480 A1 | 4/2009 | Curtis et al. |
| 2009/0106413 A1 | 4/2009 | Salo et al. |
| 2009/0119504 A1 | 5/2009 | van Os et al. |
| 2009/0125496 A1 | 5/2009 | Wexler et al. |
| 2009/0125532 A1 | 5/2009 | Wexler et al. |
| 2009/0125625 A1 | 5/2009 | Shim et al. |
| 2009/0125955 A1 | 5/2009 | DeLorme |
| 2009/0138314 A1 | 5/2009 | Bruce |
| 2009/0138749 A1 | 5/2009 | Moll et al. |
| 2009/0141891 A1 | 6/2009 | Boyen et al. |
| 2009/0144286 A1 | 6/2009 | Chatley et al. |
| 2009/0157678 A1 | 6/2009 | Turk |
| 2009/0161542 A1 | 6/2009 | Ho |
| 2009/0187915 A1 | 7/2009 | Chew et al. |
| 2009/0193126 A1 | 7/2009 | Agarwal et al. |
| 2009/0193513 A1 | 7/2009 | Agarwal et al. |
| 2009/0196282 A1 | 8/2009 | Fellman et al. |
| 2009/0217163 A1 | 8/2009 | Jaroker |
| 2009/0217386 A1 | 8/2009 | Schneider |
| 2009/0228956 A1 | 9/2009 | He et al. |
| 2009/0241176 A1 | 9/2009 | Beletski et al. |
| 2009/0248870 A1 | 10/2009 | Kamei et al. |
| 2009/0248893 A1 | 10/2009 | Richardson et al. |
| 2009/0265396 A1 | 10/2009 | Ram et al. |
| 2009/0265467 A1 | 10/2009 | Peles |
| 2009/0287935 A1 | 11/2009 | Aull et al. |
| 2009/0289828 A1 | 11/2009 | Hinchey |
| 2009/0292957 A1 | 11/2009 | Bower et al. |
| 2009/0296624 A1 | 12/2009 | Ryu et al. |
| 2009/0300161 A1 | 12/2009 | Pruitt et al. |
| 2009/0300407 A1 | 12/2009 | Kamath et al. |
| 2009/0316708 A1 | 12/2009 | Yahyaoui et al. |
| 2009/0319600 A1 | 12/2009 | Sedan et al. |
| 2010/0011434 A1 | 1/2010 | Kay |
| 2010/0017846 A1 | 1/2010 | Huang et al. |
| 2010/0023582 A1 | 1/2010 | Pedersen et al. |
| 2010/0042743 A1 | 2/2010 | Jeon et al. |
| 2010/0061232 A1 | 3/2010 | Zhou et al. |
| 2010/0064001 A1 | 3/2010 | Daily |
| 2010/0070476 A1 | 3/2010 | O'Keefe et al. |
| 2010/0071048 A1 | 3/2010 | Novak et al. |
| 2010/0093318 A1 | 4/2010 | Zhu et al. |
| 2010/0103820 A1 | 4/2010 | Fuller et al. |
| 2010/0115236 A1 | 5/2010 | Bataineh et al. |
| 2010/0122091 A1 | 5/2010 | Huang et al. |
| 2010/0131654 A1 | 5/2010 | Malakapalli et al. |
| 2010/0150154 A1 | 6/2010 | Viger et al. |
| 2010/0154031 A1 | 6/2010 | Montemurro et al. |
| 2010/0165877 A1 | 7/2010 | Shukla et al. |
| 2010/0179984 A1 | 7/2010 | Sebastian |
| 2010/0188976 A1 | 7/2010 | Rahman et al. |
| 2010/0189052 A1 | 7/2010 | Kavanagh |
| 2010/0228814 A1 | 9/2010 | McKenna et al. |
| 2010/0228819 A1 | 9/2010 | Wei |
| 2010/0242092 A1 | 9/2010 | Harris et al. |
| 2010/0250497 A1 | 9/2010 | Redlich et al. |
| 2010/0251330 A1 | 9/2010 | Kroeselberg et al. |
| 2010/0261479 A1 | 10/2010 | Hidaka |
| 2010/0274772 A1 | 10/2010 | Samuels |
| 2010/0278733 A1 | 11/2010 | Karsten et al. |
| 2010/0299451 A1 | 11/2010 | Yigang et al. |
| 2010/0306169 A1 | 12/2010 | Pishevar et al. |
| 2010/0306827 A1 | 12/2010 | Esteve Balducci et al. |
| 2010/0322250 A1 | 12/2010 | Shetty et al. |
| 2010/0325277 A1 | 12/2010 | Muthiah et al. |
| 2011/0040889 A1 | 2/2011 | Garrett et al. |
| 2011/0047620 A1 | 2/2011 | Mahaffey et al. |
| 2011/0055921 A1 | 3/2011 | Narayanaswamy et al. |
| 2011/0066718 A1 | 3/2011 | Susai et al. |
| 2011/0066736 A1 | 3/2011 | Mitchell et al. |
| 2011/0072321 A1 | 3/2011 | Dhuse |
| 2011/0075592 A1 | 3/2011 | Beecroft |
| 2011/0075667 A1 | 3/2011 | Li et al. |
| 2011/0078303 A1 | 3/2011 | Li et al. |
| 2011/0098087 A1 | 4/2011 | Tseng |
| 2011/0107077 A1 | 5/2011 | Henderson et al. |
| 2011/0113095 A1 | 5/2011 | Hatami-Hama |
| 2011/0153822 A1 | 6/2011 | Rajan et al. |
| 2011/0153985 A1 | 6/2011 | Pafumi et al. |
| 2011/0154443 A1 | 6/2011 | Thakur et al. |
| 2011/0185065 A1 | 6/2011 | Stanisic et al. |
| 2011/0173295 A1 | 7/2011 | Bakke et al. |
| 2011/0184733 A1 | 7/2011 | Yu et al. |
| 2011/0185082 A1 | 7/2011 | Thompson |
| 2011/0188415 A1 | 8/2011 | Graziano |
| 2011/0197059 A1 | 8/2011 | Klein et al. |
| 2011/0202676 A1 | 8/2011 | Craig |
| 2011/0213911 A1 | 9/2011 | Eldus et al. |
| 2011/0225302 A1* | 9/2011 | Park ............... H04L 65/4084 709/227 |
| 2011/0246800 A1 | 10/2011 | Accpadi et al. |
| 2011/0273984 A1 | 11/2011 | Hsu et al. |
| 2011/0277016 A1 | 11/2011 | Hockings et al. |
| 2011/0282700 A1 | 11/2011 | Cockcroft |
| 2011/0282997 A1 | 11/2011 | Prince et al. |
| 2011/0314178 A1 | 12/2011 | Kanode et al. |
| 2011/0321122 A1 | 12/2011 | Mwangi et al. |
| 2012/0016994 A1 | 1/2012 | Nakamura |
| 2012/0030341 A1 | 2/2012 | Jensen et al. |
| 2012/0039341 A1 | 2/2012 | Latif et al. |
| 2012/0041965 A1 | 2/2012 | Vasquez |
| 2012/0063314 A1 | 3/2012 | Pignataro et al. |
| 2012/0066489 A1 | 3/2012 | Ozaki et al. |
| 2012/0079055 A1 | 3/2012 | Robinson |
| 2012/0094631 A1 | 4/2012 | Pattabiraman |
| 2012/0101952 A1 | 4/2012 | Raleigh et al. |
| 2012/0102011 A1 | 5/2012 | Matsuki et al. |
| 2012/0117028 A1 | 5/2012 | Gold et al. |
| 2012/0124372 A1 | 5/2012 | Dilley et al. |
| 2012/0137020 A1* | 5/2012 | Ehlers ............ H04L 12/4633 709/236 |
| 2012/0150805 A1 | 6/2012 | Pafumi et al. |
| 2012/0158988 A1* | 6/2012 | Fatehpuria ...... H04L 65/4084 709/234 |
| 2012/0191847 A1 | 7/2012 | Nas et al. |
| 2012/0195273 A1 | 8/2012 | Iwamura et al. |
| 2012/0198043 A1 | 8/2012 | Hesketh et al. |
| 2012/0224531 A1 | 9/2012 | Karuturi et al. |
| 2012/0254293 A1 | 10/2012 | Winter et al. |
| 2012/0257506 A1 | 10/2012 | Baziamacci et al. |
| 2012/0258766 A1 | 10/2012 | Cho et al. |
| 2012/0311153 A1 | 12/2012 | Morgan |
| 2012/0311174 A1* | 12/2012 | Bichot ............ H04N 21/44209 709/231 |
| 2012/0317266 A1 | 12/2012 | Abbott |
| 2013/0003106 A1 | 1/2013 | Lowery et al. |
| 2013/0029726 A1 | 1/2013 | Berionne et al. |
| 2013/0031060 A1 | 1/2013 | Lowery et al. |
| 2013/0058229 A1 | 3/2013 | Casado et al. |
| 2013/0073713 A1 | 3/2013 | Collin et al. |
| 2013/0091002 A1 | 4/2013 | Christie et al. |
| 2013/0114497 A1 | 5/2013 | Zhang et al. |
| 2013/0163758 A1 | 6/2013 | Swaminathan et al. |
| 2013/0182713 A1 | 7/2013 | Giacomoni et al. |
| 2013/0198322 A1 | 8/2013 | Oran et al. |
| 2013/0205361 A1 | 8/2013 | Narayanaswamy et al. |
| 2013/0238472 A1 | 9/2013 | Fan et al. |

(56) References Cited

U.S. PATENT DOCUMENTS

| | | | |
|---|---|---|---|
| 2013/0290492 A1 | 10/2013 | ElArabawy et al. | |
| 2013/0336122 A1 | 12/2013 | Baruah et al. | |
| 2013/0339519 A1* | 12/2013 | Lientz | H04L 41/0896 709/224 |
| 2014/0025823 A1 | 1/2014 | Szabo et al. | |
| 2014/0040478 A1 | 2/2014 | Hsu et al. | |
| 2014/0059678 A1 | 2/2014 | Parker | |
| 2014/0071895 A1 | 3/2014 | Bane et al. | |
| 2014/0095661 A1 | 4/2014 | Knowles et al. | |
| 2014/0099945 A1 | 4/2014 | Singh et al. | |
| 2014/0105069 A1 | 4/2014 | Potnuru | |
| 2014/0162705 A1 | 6/2014 | de Wit et al. | |
| 2014/0171089 A1 | 6/2014 | Janakiraman et al. | |
| 2014/0187199 A1 | 7/2014 | Yan et al. | |
| 2014/0269484 A1 | 9/2014 | Dankberg et al. | |
| 2014/0286316 A1 | 9/2014 | Park et al. | |
| 2014/0317404 A1 | 10/2014 | Carlson et al. | |
| 2014/0379910 A1 | 12/2014 | Saxena et al. | |
| 2015/0058595 A1 | 2/2015 | Gura et al. | |
| 2015/0189010 A1 | 6/2015 | van Bemmel | |
| 2016/0006634 A1 | 1/2016 | Li et al. | |
| 2016/0028855 A1 | 1/2016 | Goyal et al. | |

FOREIGN PATENT DOCUMENTS

| | | |
|---|---|---|
| EP | 0744850 A2 | 11/1996 |
| EP | 1081918 A2 | 8/2000 |
| GB | 2489735 A | 10/2012 |
| JP | 6205006 A3 | 7/1994 |
| JP | 821924 B2 | 3/1996 |
| JP | 2000183935 A3 | 6/2000 |
| WO | WO 91/14326 | 9/1991 |
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |
| WO | WO 00/58870 | 3/2000 |
| WO | WO 2002/39696 A2 | 5/2002 |
| WO | WO 2006/091040 A1 | 8/2006 |
| WO | WO 2012/136828 A1 | 10/2012 |

OTHER PUBLICATIONS

"BIG-IP Controller with Exclusive OneConnect Content Switching Feature Provides a Breakthrough System for Maximizing Server and Network Performance," F5 Networks, Inc. Press Release, May 8, 2001, 2 pp., F5 Network, Las Vegas, Nevada.
"Diameter MBLB Support Phase 2: Generic Message Based Load Balancing (GMBLB)", last accessed Mar. 29, 2010, pp. 1-10, (http://peterpan.f5net.com/twiki/bin/view/TMOS/TMOSDiameterMBLB).
"Market Research & Releases, CMPP PoC documentation", last accessed Mar. 29, 2010, (http://mainstreet/sites/PD/Teams/ProdMgmt/MarketResearch/Universal).
"Market Research & Releases, Solstice Diameter Requirements", last accessed Mar 29, 2010, (http://mainstreet/sites/PD/Teams/PrdoMgmt/MarketResearch/Universal).
"Respond to server depending on TCP::clientport", DevCentral Forums iRules, pp. 1-6, last accessed Mar. 26, 2010, (http://devcentral.f5.com/Default/aspx?tabid=53&forumid=5&tpage=1&v).
"Servlet/Applet/HTML Authentication Process With Single Sign-On," Research Disclosure 429128, Jan. 2000, pp. 163-164, IBM Corporation.
"Traffic Surges; Surge Queue; Netscaler Defense," 2005, PowerPoint Presentation, slides 1-12, Citrix Systems, Inc.
"UDDI Overview", Sep. 6, 2000, pp. 1-21, uddi.org, (http://www.uddi.org/).
"UDDI Technical White Paper," Sep. 6, 2000, pgs. 1-12, uddi-org, (http://www.uddi.org/).
"UDDI Version 3.0.1", UDDI Spec Technical Committee Specification, Oct. 14, 2003, pp. 1-383, uddi.org, (http://www.uddi.org/).
"Windows Server 2003 Kerberos Extensions," Microsoft TechNet, 2003 (Updated Jul. 31, 2004), http://technet.microsoft.com/en-us/library/cc738207, Microsoft Corporation.
Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pgs. 1-8.
Baer, T., et al., "The elements of Web services" ADTmag.com, Dec. 1, 2002, pp. 1-6, (http://www.adtmag.com).
Blue Coat, "Technology Primer: CIFS Protocol Optimization," Blue Coat Systems Inc., 2007, last accessed: Dec. 9, 2013, pp. 1-3, (http://www.bluecoat.com).
Borovick, Lucinda, "Addressing WAN Optimization in the Integrated Services Router", White Paper, Sponsored by: Cisco Systems, Oct. 2010, pp. 1-11, IDC.
Cisco Systems, "Cisco Performance Routing (PfR)", PfR: Technology Overview, 2010, pp. 1-23.
Cisco Systems, "Cisco Performance Routing", Data Sheet, 2010, pp. 1-10.
Cisco Systems, "Cisco Wide Area Application Services Software Version 4.4 Technical Overview", White Paper, 2011, pp. 1-24.
Crescendo Networks, "Application Layer Processing (Alp)," 2003-2009, pp. 168-186, Chapter 9, CN-5000E/5500E, Foxit Software Company.
F5 Networks Inc., "3-DNS® Reference Guide, version 4.5", F5 Networks Inc., Sep. 2002, pp. 2-1 -2-28, 3-1 -3-12, 5-1 -5-24, Seattle, Washington.
F5 Networks Inc., "Big-IP® Reference Guide, version 4.5", F5 Networks Inc., Sep. 2002, pgs. 11-1-11-32, Seattle, Washington.
F5 Networks Inc., "Case Information Log for 'Issues with BoNY upgrade to 4.3'", as early as Feb. 2008.
F5 Networks Inc., "Configuration Guide for Local Traffic Management," F5 Networks Inc., Jan. 2006, version 9.2.2, 406 pgs.
F5 Networks Inc., "Deploying the Big-IP LTM for Diameter Traffic Management," F5® Deployment Guide, Publication date Sep. 2010, Version 1.2, pp. 1-19.
F5 Networks Inc., "F5 Diameter RM", Powerpoint document, Jul. 16, 2009, pp. 1-7.
F5 Networks Inc., "F5 WANJet CIFS Acceleration", White Paper, F5 Networks Inc., Mar. 2006, pp. 1-5, Seattle, Washington.
F5 Networks Inc., "Routing Global Internet Users to the Appropriate Data Center and Applications Using F5's 3-DNS Controller", F5 Networks Inc., Aug. 2001, pp. 1-4, Seattle, Washington, (http://www.f5.com/f5producs/3dns/relatedMaterials/UsingF5.html).
F5 Networks Inc., "Using F5's 3-DNS Controller to Provide High Availability Between Two or More Data Centers", F5 Networks Inc., Aug. 2001, pp. 1-4, Seattle, Washington, (http://www.f5.com/f5products/3dns/relatedMaterials/3DNSRouting.html).
F5 Networks, Inc., "Big-IP® Local Traffic ManagerTM: Implementations", F5 Networks, Inc., Jul. 8, 2015, Version 11.6, pp. 1-340.
Fajardo V., "Open Diameter Software Architecture," Jun. 25, 2004, pgs. 1-6, Version 1.0.7.
Fielding et al., "Hypertext Transfer Protocol—HTTP/1.1," Network Working Group, RFC: 2068, Jan. 1997, pp. 1-162.
Fielding et al., "Hypertext Transfer Protocol—HTTP/1.1," Network Working Group, RFC: 2616, Jun. 1999, pp. 1-176, The Internet Society.
Floyd et al., "Random Early Detection Gateways for Congestion Avoidance," Aug. 1993, pp. 1-22, IEEE/ACM Transactions on Networking, California.
Gupta et al., "Algorithms for Packet Classification", Computer Systems Laboratory, Stanford University, CA, Mar./Apr. 2001, pp. 1-29.
Heinz G., "Priorities in Stream Transmission Control Protocol (SCTP) Multistreaming", Thesis submitted to the Faculty of the University of Delaware, Spring 2003, pp. 1-35.

(56) References Cited

OTHER PUBLICATIONS

Hochmuth, Phil, "F5, CacheFlow pump up content-delivery lines," Network World Fusion, May 4, 2001, 1 page, Las Vegas, Nevada.
Ilvesmaki M., et al., "On the capabilities of application level traffic measurements to differentiate and classify Internet traffic", Presented in SPIE's International Symposium ITcom, Aug. 19-21, 2001, pp. 1-11, Denver, Colorado.
International Search Report and the Written Opinion, for International Patent Application No. PCT/US2013/026615, dated Jul. 4, 2013.
International Search Report and the Written Opinion, for International Patent Application No. PCT/US2011/058469, dated May 30, 2012.
Internet Protocol, "DARPA Internet Program Protocol Specification", (RFC:791), Information Sciences Institute, University of Southern California, Sep. 1981, pp. 1-49.
Kawamoto, D., "Amazon files for Web services patent", CNET News.com, Jul. 28, 2005, pp. 1-2, (http://news.com).
LaMonica M., "Infravio spiffs up Web services registry idea", CNET News.com, May 11, 2004, pp. 1-2, (http://www.news.com).
Macvitte, Lori., "Message-Based Load Balancing" F5 Technical Brief, pp. 1-9, 2009.
MacVittie, L., "Why Not Network-Side Pre-Fetching?," 8 pages (Apr. 14, 2009).
Modiano E., "Scheduling Algorithms for Message Transmission Over a Satellite Broadcast System," MIT Lincoln Laboratory Advanced Network Group, Nov., 1997, pp. 1-7.
Nichols K., et al., "Definition of the Differentiated Services Field (DS Field) in the IPv4 and IPv6 Headers", (RFC:2474) Network Working Group, Dec. 1998, pp. 1-19, (http://www.ietforg/rfc/rfc2474.txt).
Ott D., et al., "A Mechanism for Tcp-Friendly Transport-level Protocol Coordination", USENIX Annual Technical Conference, Jun. 10, 2002, University of North Carolina at Chapel Hill, pp. 1-12.
Owasp, "Testing for Cross site scripting", OWASP Testing Guide v2, Table of Contents, Feb. 24, 2011, pp. 1-5, (www.owasp.org/index.php/Testing_for_Cross_site_scripting).
Padmanabhan V., et al., "Using Predictive Prefetching to Improve World Wide Web Latency", SIGCOM, Jul. 1, 1996, pp. 1-15.
Raghavan B., et al., "Cloud Control with Distributed Rate Limiting", SIGCOMM07, Aug. 27-31, 2007, pp. 1-11, Department of Computer Science and Engineering, University of California, San Diego, CA.
Riverbed Technology, "Riverbed Certified Solutions Professional (RCSP) Study Guide, Exam 199-01 for RiOS v5.0", Aug. 2009, Version 2.0.2, see pp. 30-67.
Riverbed Technology, "Riverbed Optimization System (RiOS) 6.1, A Technical Overview", White Paper, 2009, pp. 1-27.
Rosen E., et al., "MPLS Label Stack Encoding", (RFC:3032) Network Working Group, Jan. 2001, pp. 1-22, (http://www.ietf.org/rfc/rfc3032.txt).
Schaefer, Ken, "IIS and Kerberos Part 5 — Protocol Transition, Constrained Delegation, S4U2S and S4U2P," Jul. 18, 2007, 21 pages, http://www.adopenstatic.comicsiblogs/ken/archive/2007/Jul. 19, 8460.aspx.
Schilit B., "Bootstrapping Location-Enhanced Web Services", University of Washington, Dec. 4, 2003, (http://www.cs.washington.eduinewsicolloq.info.html).
Seeley R., "Can Infravio technology revive UDDI?", ADTmag.com, Oct. 22, 2003, (http://www.adtmag.com).
Shohoud, Y., "Building XML Web Services with VB .Net and VB 6", Addison Wesley, Sep. 2002, pgs. 1-14.
Sleeper B., "The Evolution of UDDI", uddi.org White Paper, The Stencil Group, Inc., Jul. 19, 2002, pp. 1-15, San Francisco, California.
Sleeper B., "Why UDDI Will Succeed, Quietly: Two Factors Push Web Services Foward", The Stencil Group, Inc., Apr. 2001, pp. 1-7, San Francisco, California.
Snoeren A., et al., "Managing Cloud Resources:Distributed Rate Limited", Building and Programming the Cloud Workshop, Jan. 13, 2010, pp. 1-38, UCSDCSE Computer Science and Engineering.
Sommers F., "Whats New in UDDI 3.0—Part 1", Web Services Papers, Jan. 27, 2003, pp. 1-4, (http://www.webservices.org/index.php/articleiarticleprint/871/-1/24/).
Sommers F., "Whats New in UDDI 3.0—Part 2", Web Services Papers, Mar. 2, 2003, pp. 1-8, (http://www.web.archive.org/web/20040620131006/).
Sommers F., "Whats New in UDDI 3.0—Part 3", Web Services Papers, Sep. 2, 2003, pp. 1-4, (http://www.webservices.org/index.php/article/articleprint/894/-1/24/).
Wang B., "Priority and realtime data transfer over the best-effort Internet", Dissertation Abstract,ScholarWorks@UMASS, Sep. 2005, pp. i-xiv and pp. 1-9.
Wikipedia, "Diameter (protocol)", pp. 1-11, last accessed Oct. 27, 2010, (http://en.wikipedia.org/wiki/Diameter_(protocol)).
Williams et at, "The Ultimate Windows Server 2003 System Administrator's Guide: Forwarding Authentication," 2003, 2 pages, Figure 10.7, Addison-Wesley Professional, Boston, Massachusetts.
Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs all.jsp?arnumber=832499).

\* cited by examiner

METHODS FOR OPTIMIZING SERVICE OF CONTENT REQUESTS AND DEVICES THEREOF

This application claims the benefit of U.S. Provisional Patent Application Ser. No. 61/639,120, filed Apr. 27, 2012, which is hereby incorporated by reference in its entirety.

FIELD

This technology generally relates to network traffic management apparatuses and methods and, more particularly, to methods for optimizing service of content requests by server computing devices in a distributed network environment and devices thereof.

BACKGROUND

Network resource utilization and traffic distribution in a distributed network environment can be optimized using a network traffic management apparatus configured to communicate with client computing devices and content provider devices, such as a plurality of server computing devices in a server pool. The network traffic management apparatus is utilized to receive requests from client computing devices and communicate with the server computing devices to open connections that can be utilized to service the requests.

As an intermediary or proxy device, the network traffic management device can distribute client computing device requests across the server computing devices of the server pool. One such method of distribution is to maintain the number of open connections with each server computing device and distribute new requests from client computing devices to the server computing device having the least number of open connections.

However, the connection count is not a robust metric and server computing device load can remain relatively unbalanced using connection-based techniques which assume all connections are equal with respect to utilization of server computing device resources. For example, some requests will likely be for content of a relatively large size which will require more resources to service and other requests will likely be for content of a relatively small size requiring fewer resources and resulting in faster service.

Accordingly, unbalanced loads or hotspots associated with substantial memory, processor cycle, and/or bandwidth usage for one or more server computing devices as compared to other server computing devices in the server pool can result, thereby negatively affecting response time and associated user experience.

SUMMARY

A method for optimizing service of one or more content requests includes receiving at a network traffic management apparatus a request for content from a client computing device. A length of the content is determined with the network traffic management apparatus. A plurality of requests for a portion of the length of the content is sent with the network traffic management apparatus to a plurality of server computing devices, wherein the portion of the length of the content is specified as a byte range in a range header of each of the plurality of requests. A plurality of responses to the plurality of requests is received at the network traffic management apparatus. At least a subset of the plurality of responses is output with the network traffic management apparatus to the client computing device.

A non-transitory computer readable medium having stored thereon instructions for optimizing service of one or more content requests comprising machine executable code which when executed by a processor, causes the processor to perform steps including receiving a request for content from a client computing device. A length of the content is determined. A plurality of requests for a portion of the length of the content is sent to a plurality of server computing devices, wherein the portion of the length of the content is specified as a byte range in a range header of each of the plurality of requests. A plurality of responses to the plurality of requests is received. At least a subset of the plurality of responses is output to the client computing device.

A network traffic management apparatus includes at least one of configurable hardware logic configured to be capable of implementing or a processor or a network interface controller coupled to a memory and configured to execute programmed instructions stored in the memory including receiving a request for content from a client computing device. A length of the content is determined. A plurality of requests for a portion of the length of the content is sent to a plurality of server computing devices, wherein the portion of the length of the content is specified as a byte range in a range header of each of the plurality of requests. A plurality of responses to the plurality of requests is received. At least a subset of the plurality of responses is output to the client computing device.

This technology provides a number of advantages including methods, non-transitory computer readable medium, and network traffic management apparatus that optimize service of content requests by server computing devices to thereby balance server load and reduce the likelihood of a hotspot developing in the server pool. Additionally, with this technology, latency can be reduced, a maximum size of content requests sent to the server computing devices can be guaranteed, and the elapsed time from the client computing device request to receipt by the client computing device of the first or last byte of the requested content can be reduced.

DETAILED DESCRIPTION

Figure 1:
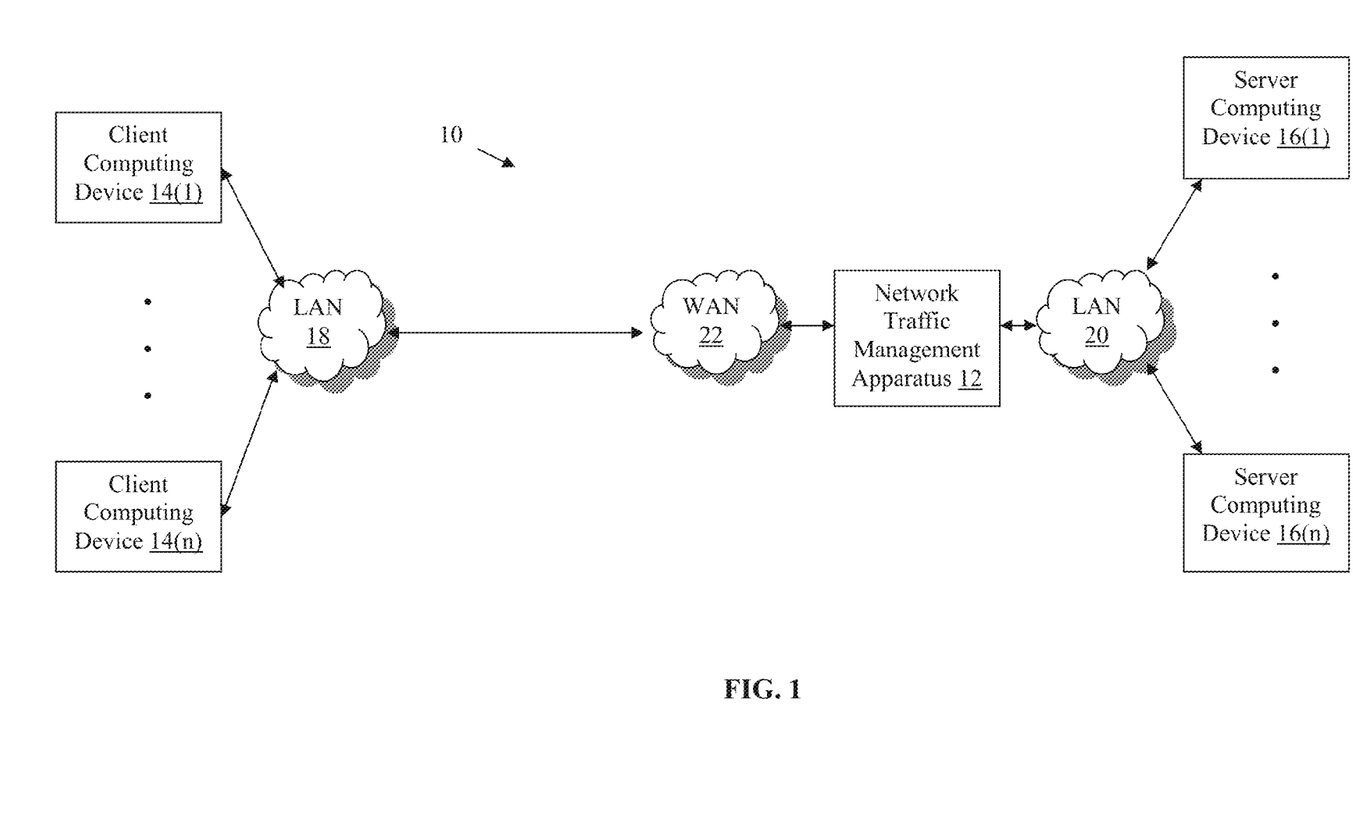
FIG. 1 is a block diagram of a network environment which incorporates an exemplary network traffic management apparatus.
Figure 2:
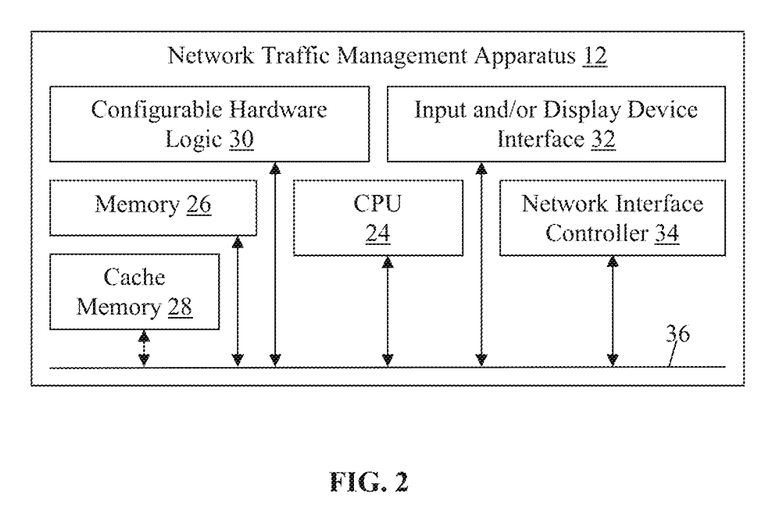
FIG. 2 is a block diagram of the exemplary network traffic management apparatus.

An exemplary network environment 10 with a network traffic management apparatus 12, client computing devices 14(1)-14(n), and server computing devices 16(1)-16(n) is illustrated in FIGS. 1 and 2. In this example, the network traffic management apparatus 12, client computing devices 14(1)-14(n), and server computing devices 16(1)-16(n) are coupled together by local area networks (LANs) 18 and 20 and wide area network (WAN) 22, although other types and numbers of systems, devices, components and other elements in other configurations which are coupled together in other manners can be used. This technology provides a number of advantages including methods, non-transitory computer readable medium, and apparatus that optimize service of content requests to balance server computing device load and reduce the risk of developing a hotspot in a server pool.

Referring more specifically to FIGS. 1 and 2, the network traffic management apparatus 12 is coupled to the client computing devices 14(1)-14(n) by the LAN 18 and WAN 20. In this example, the network traffic management apparatus 12 is further coupled to the server computing devices 16(1)-16(n) by the LAN 20. Although network traffic management apparatus 12 is shown in this example, other network devices configured to generate, send, and receive network communications and coupled together via other topologies can also be used. While not shown, the environment 10 also may include additional network components, such as routers, switches and other devices, which are well known to those of ordinary skill in the art and thus will not be described here.

The network traffic management apparatus 12 may perform any number of functions, such as optimizing, securing, and accelerating the network traffic between the client computing devices 14(1)-14(n) and the server computing devices 16(1)-16(n). The network traffic management apparatus 12 includes at least one processor or CPU 24, a memory 26, optional cache memory 28, optional configurable hardware logic 30, an input and/or display device interface 32, and a network interface controller 34 which are coupled together by a bus 36, although the network traffic management apparatus 12 may include other types and numbers of elements in other configurations. In this example, the bus 36 is a hyper-transport bus, although other bus types and links may be used, such as PCI.

The processor 24 of the network traffic management apparatus 12 may execute one or more computer-executable instructions stored in the memory 26 of the network traffic management apparatus 12 for managing network traffic and/or optimizing service of content requests. The processor 24 of the network traffic management apparatus 12 may comprise one or more central processing units (CPUs) or general purpose processors with one or more processing cores, such as AMD® processor(s), although other types of processor(s) could be used (e.g., Intel®).

The memory 24 of the network traffic management apparatus 12 stores these programmed instructions for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 24, can be used for the memory 26. The optional cache memory of the network traffic management apparatus 12 can be a static random access memory (SRAM) device for example, although other forms of memory can also be used.

The optional configurable hardware logic 30 of the network traffic management apparatus 12 may comprise specialized hardware configured to be capable of implementing one or more steps of this technology as illustrated and described with reference to the examples herein. By way of example only, the optional configurable logic 30 may comprise one or more of field programmable gate arrays (FPGAs), field programmable logic devices (FPLDs), application specific integrated circuits (ASICs) and/or programmable logic units (PLUs).

The input and display device interface 32 of the network traffic management apparatus 12 enables a user, such as an administrator, to interact with the network traffic management apparatus 12, such as to input and/or view data and/or to configure, program and/or operate it by way of example only. Input devices configured to communicate with the input and/or display device interface 32 may include a keyboard and/or a computer mouse and display devices configured to communicate with the input and/or display device interface 32 may include a computer monitor, although other types and numbers of input devices and display devices could also be used.

The network interface controller 34 operatively couples and communicates between the network traffic management apparatus 12, the client computing devices 14(1)-14(n), and server computing devices 16(1)-16(n), which are all coupled together by the LANs 18 and 20 and WAN 22, although other types and numbers of communication networks or systems with other types and numbers of connections and configurations to other devices and elements. By way of example only, the LANs 18 and 20 and WAN 22 can use TCP/IP over Ethernet and industry-standard protocols, including NFS, CIFS, SOAP, XML, LDAP, and SNMP, although other types and numbers of communication networks, can be used.

The LANs 18 and 20 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The WAN 22 may comprise any wide area network (e.g., Internet), although any other type of traffic network topology may be used.

Each of the client computing devices 14(1)-15(n) and server computing devices 16(1)-16(n) includes a central processing unit (CPU) or processor, a memory, a network interface device, and an I/O system, which are coupled together by a bus or other link, although other numbers and types of network devices could be used. The client computing devices 14(1)-14(n) may run interface application(s), such as a Web browser, that may provide an interface to make requests for and receive content stored on one or more of the server computing devices 16(1)-16(n) via the LANs 18 and 20 and/or WAN 22.

Generally, the server computing devices 16(1)-16(n) process requests received from requesting client computing devices 14(1)-14(n) via the LANs 18 and 20 and/or WAN 22 according to the HTTP-based application RFC protocol or the CIFS or NFS protocol for example. Various network processing applications, such as CIFS applications, NFS applications, HTTP Web Server applications, and/or FTP applications, may be operating on the server computing devices 16(1)-16(n) and transmitting content (e.g., files, Web pages) to the client computing devices 14(1)-14(n) in response to requests for the content from the client computing devices 14(1)-14(n).

The server computing devices 16(1)-16(n) may provide data or receive data in response to requests directed toward applications on the server computing devices 16(1)-16(n) from the client computing devices 14(1)-14(n). The server computing devices 16(1)-16(n) may be hardware or software or may represent a system with multiple server computing devices 16(1)-16(n) in a server pool, which may include internal or external networks. In this example the server computing devices 16(1)-16(n) may be any version of Microsoft® IIS servers or Apache® servers, although other types of server computing devices 16(1)-16(n) may be used. Further, additional server computing devices 16(1)-16(n) may be coupled to one of the LANs 18 and 20 and many different types of applications may be available on each of the server computing devices 16(1)-16(n).

Although an exemplary network environment with the network traffic management apparatus 12, client computing devices 14(1)-14(n), server computing devices 16(1)-16(n), LANs 18 and 20 and WAN 22 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 3:
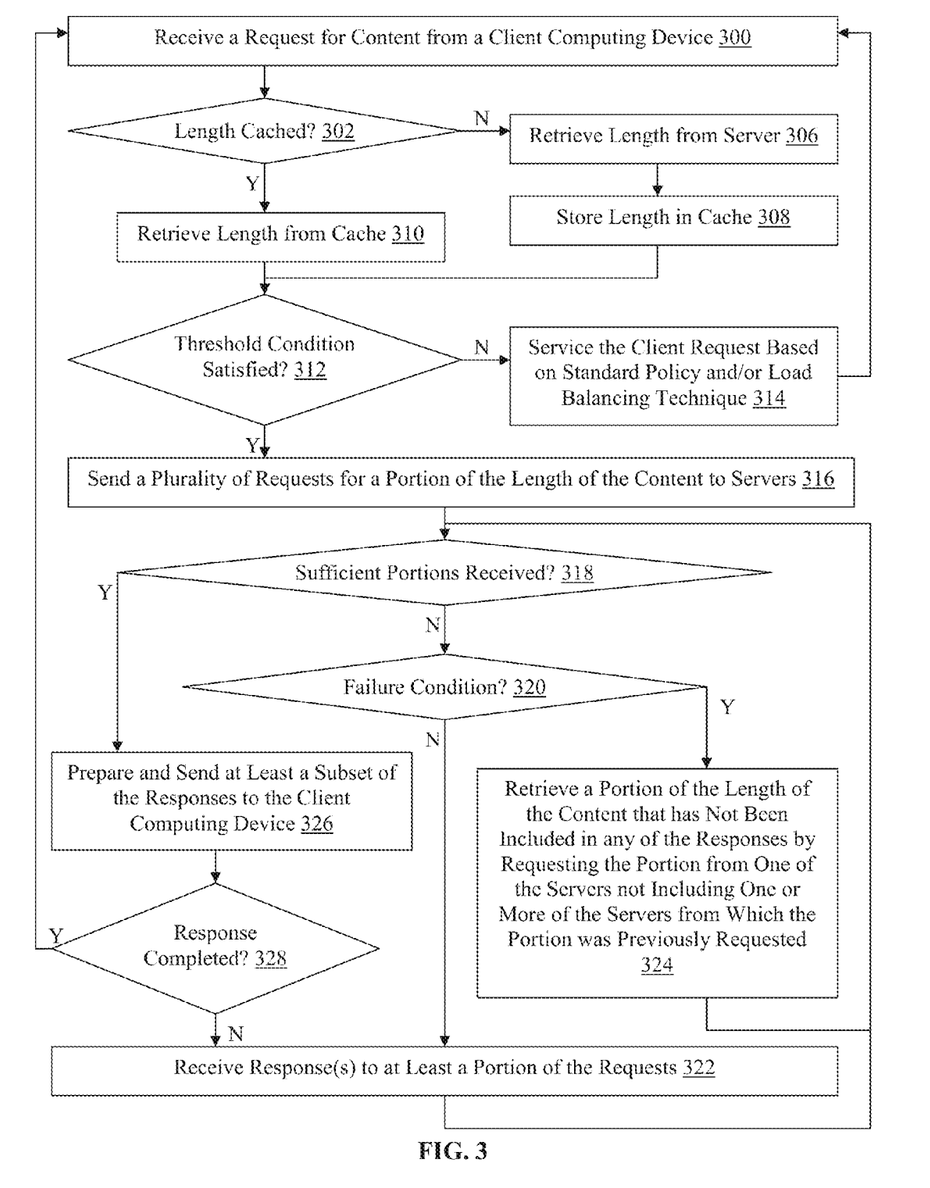
FIG. 3 is a flowchart of an exemplary method for optimizing service of content requests.

An exemplary method for optimizing service of content requests will now be described with reference to FIGS. 1-3. In this example, in step 300, the network traffic management apparatus 12 receives a request for content from one of the client computing devices 14(1)-14(n). The request for content can be a hypertext transfer protocol (HTTP) request for a hypertext markup language (HTML) web page document, a video, music, and/or graphic file, or a portable document format (PDF) file, for example, or any other type of content.

In step 302, the network traffic management apparatus 12 determines whether the length of the requested content is included in the cache memory 28. The length can be the size of the content as represented by a number of bytes and can be stored in the cache memory 28 in an entry associated with an indication of the content, for example. If the network traffic management apparatus 12 determines that the length of the requested content is not stored in the cache memory 28, or the associated entry in the cache memory is not valid, then the No branch is taken to step 306.

In step 306, the network traffic management apparatus 12 sends an HTTP head request to one of the server computing devices 16(1)-16(n) and receives the length of the content in response, although other methods for determining the length of the content can be used. Optionally, in step 308, the network traffic management apparatus 12 stores the length of the content in the cache memory 28 as associated with an indication of the requested content so that it can be retrieved and used by the network traffic management apparatus 12 when processing subsequent requests for the content.

Referring back to step 302, if the network traffic management apparatus 12 determines that the length is included in the cache memory 28, then the Yes branch is taken to step 310. In step 310, the network traffic management apparatus 12 retrieves the length from an entry of the cache memory 28 corresponding to the requested content.

In step 312, the network traffic management apparatus 12 optionally determines whether one or more threshold conditions are satisfied.

Exemplary threshold conditions include whether the requested content is larger than a specified length, whether a file type of the requested content indicated in the request matches one or more specified file types, or whether at least a portion of a path specified in the content request matches one or more specified paths, although other threshold conditions can also be used. The threshold conditions can be established by a manufacturer of the network traffic management apparatus and/or can be configurable by an administrator of the network traffic management apparatus.

If at least one of the threshold conditions is not satisfied, then the No branch is taken to step 314. In step 314, the network traffic management apparatus 12 services the request from one of the server computing devices 16(1)-16(n) based on an established policy and/or load balancing technique. While servicing the request for content, or during any of steps 302-312, the network traffic management apparatus 12 can receive one or more additional requests for content from one or more of the client computing devices 14(1)-14(n) in the step 300.

Referring back to step 312, if the network traffic management apparatus 12 determines that at least one of the threshold conditions is satisfied, then the Yes branch is taken to step 316. Accordingly, a content length, file type, path, and/or any other attribute of the content or the request, for example, can be specified to filter those requests most likely to benefit from the optimization techniques described and illustrated herein with respect to steps 316-328.

In step 316, the network traffic management apparatus 12 sends a plurality of requests for a portion of the length of the content to a plurality of the server computing devices 16(1)-16(n). In one example, the portion of the length of the content is specified as a byte range in a range header of each of the plurality of requests. Accordingly, the request received in step 300 is split by the network traffic management apparatus 12 into a plurality of requests sent to a plurality of server computing devices 16(1)-16(n). By using more than one of the server computing devices 16(1)-16(n) to service the original request, the risk that one of the server computing devices 16(1)-16(n) may become a hotspot and/or relatively over utilized, such as in the event the requested content is relatively large, is substantially reduced.

The byte ranges included in each of the plurality of requests can indicate discrete portions of the length of the content, partially overlapping portions of the length of the content, and/or completely overlapping portions of the length of the content. However, in order to ensure effective service of the request, the network traffic management apparatus 12 must send at least one request for each portion of the length of the content.

In step 318, the network traffic management apparatus 12 determines whether sufficient portions of the requested content have been received. In order to determine whether sufficient portions of the requested content have been received, the network traffic management apparatus 12 determines whether at least a subset of any received responses include an initial byte range portion of the requested content. If the received responses do not include an initial portion of the requested content greater than a threshold, or if sufficient portions of the content have not been received based on any other criteria, then the No branch is taken to step 322. The condition in step 320 will not be satisfied immediately subsequent to the network traffic management apparatus sending the plurality of requests in step 316 as, generally, insufficient time will have elapsed to receive any responses to the plurality of requests.

In step 320, the network traffic management apparatus determines whether a failure condition has been satisfied. In one example, the failure condition is a failure of the network traffic management apparatus to receive one or more responses that include one or more byte ranges of the requested content within a specified time period, although other failure conditions can be used. If the network traffic management apparatus 12 determines that a failure condition has not been satisfied, then the No branch is taken to step 322. The condition in step 322 will not be initially satisfied as the elapsed time subsequent to sending the plurality of requests on an initial pass will not generally be greater than the specified time period.

In step 322, the network traffic management apparatus 12 receives a response to one or more of the plurality of requests. In some examples, the responses will include various byte range portions of the length of the content. In some examples, step 322 is performed in parallel with any of steps 318, 320, 324, 326, or 328. Referring back to step 320, if the network traffic management apparatus 12 determines, generally in a pass subsequent to an initial pass, a failure condition has been satisfied, then the Yes branch is taken to step 324.

In step 324, the network traffic management apparatus 12 requests at least one missing portion of the length of the content, or portion that has not been received during a specified time period, from at least one of the server computing devices 16(1)-16(n) from which the missing portion was not previously requested. Thereby, the missing portion of the length of the content is not requested twice from one of the server computing devices 16(1)-16(n) that may have failed to promptly respond to the first request for that portion. Subsequent to receiving one or more responses in step 322 or retrieving the missing portion of the length of the content in step 324, the network traffic management apparatus 12 can proceed to step 318.

If, in step 318, the network traffic management apparatus determines, generally in a pass subsequent to an initial pass, sufficient portions of the requested content have been received, then the Yes branch is taken to step 326.

In step 326, the network traffic management apparatus 12 prepares and sends at least a subset of the responses received in step 322 to the requesting one of the client computing devices 14(1)-14(n). Accordingly, in this example, the network traffic management apparatus 12 can send an initial portion, based on byte range order, of the requested content to the requesting one of the client computing devices 14(1)-14(n) prior to receiving responses including byte ranges representing subsequent portions of the requested content.

In one example, the initial portion can be a single byte range such that the byte ranges are sent to the requesting one of the client computing devices 14(1)-14(n) as they are received, as long as all lower byte range portions have previously been sent to the requesting one of the client computing devices 14(1)-14(n) and the byte range order is maintained. In another example, the initial portion can be the entire portion of the requested content such that the network traffic management apparatus 12 waits until responses including byte ranges representing all portions of the requested content are received before sending any response to the requesting one of the client computing devices 14(1)-14(n). In yet other examples, the initial portion can be determined based on any other criteria such as a threshold size, number of byte ranges, or percentage of the requested content, for example.

In order to prepare the at least a subset of the responses, the network traffic management apparatus reformats the responses such as by organizing the byte ranges, discarding any overlapping byte ranges, generating appropriate response headers, for example. The at least a subset of the responses can be sent by the network traffic management apparatus 12 as a single HTTP response, such that each communication includes substantially the same HTTP response header. Accordingly, in one example, the responses can be buffered, organized, and/or arranged, and sent to the requesting one of the client computing devices 14(1)-14(n) in byte range order.

In step 328, the network traffic management apparatus 12 determines whether a response to the request received from the requesting one of the client computing devices 14(1)-14(n) has been completed. In this example, the network traffic management apparatus 12 determines whether the subset of the plurality of responses sent to the requesting one of the client computing devices 14(1)-14(n) in step 326 represents the entire requested content. In some examples, the responses from the server computing devices 16(1)-16(n) are prepared and sent to the requesting one of the client computing devices 14(1)-14(n) in byte range order. In these examples, the network traffic management apparatus 12 can determine whether a response has been completed in step 328 based on whether the last byte range of the length of the requested content has been sent to the requesting one of the client computing devices 14(1)-14(n). Other methods of determining whether a response has been completed can also be used.

If the network traffic management apparatus 12 determines in step 328 that a response has not been completed, then the No branch is taken back to step 322 and one or more additional responses are received by the network traffic management apparatus 12 from the server computing devices 16(1)-16(n). If the network traffic management apparatus 12 determines a valid response has been completed, then the Yes branch is taken to step 300 and a new request for content is received from one of the client computing devices 14(1)-14(n). The network traffic management apparatus 12 can also perform step 300 in parallel to any of steps 302-328 such that multiple requests for content are processed in parallel.

Thereby, the requesting one of the client computing devices 14(1)-14(n) receives a response to the initial request for content and is unaware that the request has been split into a plurality of requests for various byte range portions of the length of the requested content. In addition to mitigating hotspots, splitting the content request into a plurality of requests provides several advantages as described and illustrated below with respect to several exemplary techniques for optimizing service of content requests received from the client computing devices 14(1)-14(n).

In one example, steps 300-310, 314, and 318-328 proceed as described and illustrated earlier. However, in step 312, the network traffic management apparatus 12 determines whether the threshold condition of whether the requested content is greater than a specified size is satisfied. If the network traffic management apparatus 12 determines in step 312 that the requested content is not greater than a specified size, then the No branch is taken to step 314. Accordingly, in this example, the content request is not split into a plurality of requests for portions of the content when the content is of a relatively small size. Thereby, overhead is reduced with respect to requests that can otherwise be serviced relatively quickly and with relatively low consumption of server resources using standard policy and/or load balancing techniques in step 314.

In this example, if the network traffic management apparatus 12 determines in step 312 that the requested content is greater than a specified size, then the Yes branch is taken to step 316. In this example, the byte range specified in the range header of each of the requests sent in step 316 is based on a total number of server computing devices 16(1)-16(n) in the server pool. Accordingly, each request includes a byte range in a range header which is equal to the length of the content, as determined in step 310 or 306, divided by the number of server computing devices 16(1)-16(n). Additionally, one of the plurality of requests is sent to each of the plurality of server computing devices 16(1)-16(n).

Thereby, portions of the requested content of substantially the same size are requested from each of the server computing devices 16(1)-16(n). Accordingly, in this example, in addition to reducing the risk of developing a hotspot, the network traffic management apparatus 12 can advantageously guarantee balanced distribution of the load with respect to the size of the content requested from each of the server computing devices 16(1)-16(n).

In another example, steps 300-314 and 318-328 proceed as described and illustrated earlier. However, in step 316, the byte range specified in the range header of at least a subset of the plurality of requests sent by the network traffic management apparatus 12 is not greater than a maximum byte range size, not greater than a network frame payload size, or substantially equal to a uniform byte range size. The maximum byte range size, network frame payload size, and/or uniform byte range size can be established by a manufacturer of the network traffic management apparatus 12 and/or can be configurable by an administrator of the network traffic management apparatus 12, for example.

By limiting the byte range size to a maximum size, established network frame payload, or other uniform size in this example, each of the server computing devices 16(1)-16(n) will be servicing requests for relatively small portions of the requested content or for portions that are substantially the same size. Thereby, the potential for the server computing devices 16(1)-16(n) to develop a hotspot will therefore be reduced. Limiting the byte range size included in the range headers of at least a subset of the plurality of requests can have additional advantages described and illustrated below.

By limiting the byte ranges to a maximum size, the network traffic management apparatus 12 can guarantee that the server computing devices 16(1)-16(n) will never service requests for portions of the content larger than the maximum size. Accordingly, the server computing devices 16(1)-16(n) can advantageously be configured and optimized based on the constraint of the maximum size. For example, the server computing devices 16(1)-16(n) can be configured based on the assumption that memory space larger than the maximum size will never be allocated in order to service a request for a portion of the requested content.

By limiting the byte ranges to a size not greater than a network frame payload size, network latency, including response time of the server computing devices 16(1)-16(n), can advantageously be reduced. In one example, the network frame payload size can be equal to the maximum frame payload size for Ethernet compatible devices (e.g. 1500 bytes).

By limiting the bye ranges to a uniform byte range size, the effectiveness of caching techniques utilized by the server computing devices 16(1)-16(n) can be increased. By splitting the original content request into a plurality of requests specifying a uniform byte range size, subsequent requests for the content received from the client computing devices 14(1)-14(n) can also be split into a plurality of requests specifying the same uniform byte range size.

Accordingly, in examples in which the portions of the content requested from the server computing devices 16(1)-16(n) are cached by the server computing devices 16(1)-16(n), subsequent requests for the portions of the content can be retrieved from cache rather than slower storage memory of the server computing devices 16(1)-16(n). The uniform byte range size can be the maximum size, the network frame payload size, or the length of the content divided by the number of server computing devices 16(1)-16(n), for example, although other uniform byte range sizes can also be used.

In yet another example, steps 300-310, 320-324, and 328 proceed as described and illustrated earlier. However, in step 312, the network traffic management apparatus 12 determines whether the threshold condition of whether the requested content is of a specified video file type, as determined based on the file extension (e.g. MPEG or WMV) of the requested content, is satisfied. If the network traffic management apparatus 12 determines in step 312 that the requested content is not of a specified video file type, then the No branch is taken to step 314.

Accordingly, in this example, content requests are not split into a plurality of requests for portions of the content when the content is not a video file. As video files are likely to be relatively large in size, overhead is reduced with respect to requests that can otherwise be serviced relatively quickly and with relatively low consumption of server resources using standard policy and/or load balancing techniques in step 314.

If the network traffic management apparatus 12 determines in step 312 that the requested content is not of a specified video file type, then the Yes branch is taken to step 316. In step 316, the network traffic management apparatus 12 sends one or more requests for relatively low byte range portions of the content to one or more relatively high performance ones of the server computing devices 16(1)-16(n). Additionally, the network traffic management apparatus 12 sends one or more requests for relatively high byte range portions of the content to one or more relatively low performance ones of the server computing devices 16(1)-16(n). Optionally, the requests for relatively low byte range portions of the content can be sent to one or more of the server computing devices 16(1)-16(n) in relatively close geographic proximity to the network traffic management apparatus 12, with relatively fast hardware or storage devices, statically or dynamically categorized or profiled as relatively fast, or otherwise likely to respond more quickly than one or more other of the server computing devices 16(1)-16(n).

In step 318, the network traffic management apparatus 12 determines whether sufficient portions of the content have been received. In this example, the network traffic management apparatus 12 determines whether a response has been received from one of the server computing devices 16(1)-16(n) that includes the lowest byte range portion of the content that has not previously been sent to the requesting one of the client computing devices 14(1)-14(n). If the network traffic management apparatus 12 determines a response has not been received from one of the server computing devices 16(1)-16(n) that includes the lowest byte range portion of the content that has not previously been sent to the requesting one of the client computing devices 14(1)-14(n), then the No branch is taken to step 320.

If the network traffic management apparatus 12 determines a response has been received from one of the server computing devices 16(1)-16(n) that includes the lowest byte range portion of the content that has not previously been sent to the requesting one of the client computing devices 14(1)-14(n), then the Yes branch is taken to step 326. In step 326, the network traffic management apparatus 12 sends response(s) to the request(s) for relatively low byte range portions of the content to the requesting one of the client computing devices 16(1)-16(n) in byte range order and irrespective of whether response(s) to the request(s) for relatively high byte range portions of the content have been received.

Thereby, relatively low byte range portions of the content will be sent to the requesting one of the client computing devices 14(1)-14(n) relatively quickly while the network traffic management apparatus 12 is requesting and/or receiving relatively high byte range portions of the content. In this example, the relatively low byte range portions of the content will likely be initial segments of a video file. Accordingly, the requesting one of the client computing devices 14(1)-14(n) can process the initial segments and begin playing the video, while the remaining portions of the video are received from the network traffic management apparatus 12. Therefore, a user of the requesting one of the client computing devices 14(1)-14(n) can receive and interact with initial video segments in relatively less time, thereby improving the user's experience and reducing the time required for the requesting one of the client computing devices 14(1)-14(n) to receive the first byte of the content.

Additionally, in this example, a plurality of the server computing devices 16(1)-16(n) can respond to requests for portions of the content instead of one of the server computing devices 16(1)-16(n) servicing a request for the video file. As the video file is likely to be relatively large in size, distributing the content request can reduce the risk of developing a hotspot in the server pool resulting from one of the server computing devices 16(1)-16(n) servicing the request for relatively large content.

In yet another example, steps 300-310, 320-324, and 328 proceed as described and illustrated earlier. However, in step 312, the network traffic management apparatus 12 determines whether the threshold condition of whether at least a portion of a path specified in the request for content matches a specified path is satisfied. The specified path can be a URL, for example, identifying a path at which content is located that, when accessed or requested, must be sent to the requesting one of the client computing devices 14(1)-14(n) as quickly as possible. If the network traffic management apparatus 12 determines in step 312 that at least a portion of the path specified in the request for content does not match the specified path, then the No branch is taken to step 314 and the request is serviced as described and illustrated earlier.

If the network traffic management apparatus 12 determines in step 312 that at least a portion of the path specified in the content request does match the specified path, then the Yes branch is taken to step 316. In step 316, the network traffic management apparatus 12 sends the plurality of requests such that the byte ranges specified in the range headers of at least a subset of the plurality of requests completely overlap. Optionally, each byte range portion of the requested content can be requested from each of the server computing devices 16(1)-16(n). As each of the server computing devices 16(1)-16(n) receives the same number of requests and the entirety of the content is requested from each of the server computing devices 16(1)-16(n), the load will be evenly distributed and the risk of developing a hotspot will be reduced.

In step 318, the network traffic management apparatus 12 determines whether sufficient portions of the content have been received. In this example, the network traffic management apparatus 12 determines whether a response is received that includes the lowest overlapping byte range portion of the content that has not previously been sent to the requesting one of the client computing devices 14(1)-14(n). If the network traffic management apparatus 12 determines a response is received that does not include the lowest overlapping byte range portion of the content that has not previously been sent to the requesting one of the client computing devices 14(1)-14(n), then the No branch is taken to step 320.

If the network traffic management apparatus 12 determines a response is received that does include the lowest overlapping byte range portion of the content that has not previously been sent to the requesting one of the client computing devices 14(1)-14(n), then the Yes branch is taken to step 326. In step 326, the network traffic management apparatus 12 sends to the requesting one of the client computing devices 14(1)-14(n) each first received response that includes an overlapping byte range portion of the content in byte range order. Because, in this example, each byte range portion of the requested content is requested from each of the server computing devices 16(1)-16(n), the request for content can be serviced as fast as possible based on the resources of the server pool.

Accordingly, the network traffic management apparatus 12 can send to the requesting one of the client computing devices 14(1)-14(n) each portion of the requested content in byte range order and as received from the one of the server computing devices 16(1)-16(m) capable of sending a response to each of the requests for the byte range portions in the least amount of time. Thereby, the network traffic management apparatus 12 is able to optimize service of the content request by reducing the time required for the requesting one of the client computing devices to receive the last byte of the requested content.

In other examples, a plurality of techniques for optimizing service of the request for content is utilized by the network traffic management apparatus 12. In these examples, the threshold conditions can also be used to determine which technique(s) should be utilized and the various parameters of implementing the technique. Parameters for implementing the optimization techniques can include which of the server computing devices 16(1)-16(n) to utilize, the byte range size to utilize, the level of response buffering, whether multiple requests are to be made for the same content, and the level of redundancy, for example, although other permutation of threshold conditions, methods of determining which technique to apply, and the parameters can also be used.

By this technology, a network traffic management apparatus generates a plurality of requests to a plurality of server computing devices in response to a request for content received from a client computing device.

Thereby, portions of the requested content are retrieved from a plurality of server computing devices instead of the content being retrieved from one server computing device. Accordingly, the risk of a hotspot developing in the server pool due to one or more requests for relatively large content is reduced. Several other advantages include the ability to reduce the time to first byte and/or time to last byte for the client computing device and guaranteeing a maximum or uniform size of requests sent by the network traffic management device to the server computing devices.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for improving server load balancing and optimizing service of content requests by reducing latency, the method implemented by a network traffic management system comprising one or more network traffic management apparatuses, server devices, or client devices and comprising:
   receiving a request for content from a client via one or more communication networks;
   sending a plurality of requests for different portions of the content to a plurality of servers via another one or more communication networks, wherein a request for a first of the different portions is sent to one of the servers having a first performance level, another request for a second of the different portions is sent to another one of the servers having a second performance level different from the first performance level, and a byte range specified in a range header of at least a subset of the plurality of requests is not greater than a network frame payload size;
   receiving a plurality of responses to the plurality of requests via the another one or more communication networks; and
   forwarding at least a subset of the plurality of responses to the client via the one or more communication networks.

2. The method as set forth in claim 1 further comprising determining the first or second byte range based on a total number of servers in the plurality of servers.

3. The method as set forth in claim 1 wherein:
   byte ranges of at least a subset of the requests at least partially overlap; and
   the method further comprises outputting at least partially overlapping byte ranges included in each first received one of the responses to one of the subset of the requests.

4. The method as set forth in claim 1 further comprising:
   determining when one or more threshold conditions are satisfied, wherein the threshold conditions are selected from whether the requested content is larger than a specified length, when a file type of the requested content matches one or more specified file types, or when at least a portion of a path specified in the request for content matches one or more specified paths; and
   outputting the requests only when the determining indicates that the one or more threshold conditions are satisfied.

5. The method as set forth in claim 1 wherein the first or second performance level is based on a geographic location of the one or more servers, a type or speed or hardware or one or more storage devices of the one or more servers, a static or dynamic categorization or profile of one or more capabilities of one or more of the servers.

6. The method as set forth in claim 1 wherein the second of the different portions is located at a different byte range of the content than the first of the different portions.

7. A non-transitory computer readable medium having stored thereon instructions for improving server load balancing and optimizing service of content requests by reducing latency comprising machine executable code which when executed by at least one processor, causes the processor to:
   receive a request for content from a client via one or more communication networks;
   send a plurality of requests for different portions of the content to a plurality of servers via another one or more communication networks, wherein a request for a first of the different portions is sent to one of the servers having a first performance level, another request for a second of the different portions is sent to another one of the servers having a second performance level different from the first performance level, and a byte range specified in a range header of at least a subset of the plurality of requests is not greater than a network frame payload size;
   receive a plurality of responses to the plurality of requests via the another one or more communication networks; and
   forward at least a subset of the plurality of responses to the client via the one or more communication networks.

8. The medium as set forth in claim 7 wherein the machine executable code, when executed by the processor further causes the processor to determine the first or second byte range based on a total number of servers in the plurality of servers.

9. The medium as set forth in claim 7 wherein:
   byte ranges of at least a subset of the requests at least partially overlap; and
   the machine executable code, when executed by the processor further causes the processor to output at least partially overlapping byte ranges included in each first received one of the responses to one of the subset of the requests.

10. The medium as set forth in claim 7 wherein the machine executable code, when executed by the processor further causes the processor to:
    determine when one or more threshold conditions are satisfied wherein the threshold conditions are selected from whether the requested content is larger than a specified length, when a file type of the requested content matches one or more specified file types, or when at least a portion of a path specified in the request for content matches one or more specified paths; and
    output the requests only when the determining indicates that the one or more threshold conditions are satisfied.

11. The medium as set forth in claim 7 wherein the first or second performance level is based on a geographic location of the one or more servers, a type or speed or hardware or one or more storage devices of the one or more servers, a static or dynamic categorization or profile of one or more capabilities of one or more of the servers.

12. The medium as set forth in claim 7 wherein the second of the different portions is located at a different byte range of the content than the first of the different portions.

13. A network traffic management apparatus, comprising memory comprising programmed instructions stored thereon and one or more processors configured to be capable of executing the stored programmed instructions to:

receive a request for content from a client via one or more communication networks;

send a plurality of requests for different portions of the content to a plurality of servers via another one or more communication networks, wherein a request for a first of the different portions is sent to one of the servers having a first performance level, another request for a second of the different portions is sent to another one of the servers having a second performance level different from the first performance level, and a byte range specified in a range header of at least a subset of the plurality of requests is not greater than a network frame payload size;

receive a plurality of responses to the plurality of requests via the another one or more communication networks; and forward at least a subset of the plurality of responses to the client via the one or more communication networks.

14. The network traffic management apparatus as set forth in claim 13 wherein the one or more processors are further configured to be capable of executing the stored programmed instructions to determine the first or second byte range based on a total number of servers in the plurality of servers.

15. The network traffic management apparatus as set forth in claim 13 wherein:

byte ranges of at least a subset of the requests at least partially overlap; and the one or more processors are further configured to be capable of executing the stored programmed instructions to output at least partially overlapping byte ranges included in each first received one of the responses to one of the subset of the requests.

16. The network traffic management apparatus as set forth in claim 13 wherein the one or more processors are further configured to be capable of executing the stored programmed instructions to:

determine when one or more threshold conditions are satisfied wherein the threshold conditions are selected from whether the requested content is larger than a specified length, when a file type of the requested content matches one or more specified file types, or when at least a portion of a path specified in the request for content matches one or more specified paths; and output the requests only when the determining indicates that the one or more threshold conditions are satisfied.

17. The network traffic management apparatus as set forth in claim 13 wherein the first or second performance level is based on a geographic location of the one or more servers, a type or speed or hardware or one or more storage devices of the one or more servers, a static or dynamic categorization or profile of one or more capabilities of one or more of the servers.

18. The network traffic management apparatus as set forth in claim 13 wherein the second of the different portions is located at a different byte range of the content than the first of the different portions.

19. A network traffic management system comprising one or more network traffic management apparatuses, server devices, or client devices, the network traffic management system comprising memory comprising programmed instructions stored thereon and one or more processors configured to be capable of executing the stored programmed instructions to:

receive a request for content from a client via one or more communication networks;

send a plurality of requests for different portions of the content to a plurality of servers via another one or more communication networks, wherein a request for a first of the different portions is sent to one of the servers having a first performance level, another request for a second of the different portions is sent to another one of the servers having a second performance level different from the first performance level, and a byte range specified in a range header of at least a subset of the plurality of requests is not greater than a network frame payload size;

receive a plurality of responses to the plurality of requests via the another one or more communication networks; and forward at least a subset of the plurality of responses to the client via the one or more communication networks.

20. The network traffic management system of claim 19, wherein the one or more processors are further configured to be capable of executing the stored programmed instructions to determine the first or second byte range based on a total number of servers in the plurality of servers.

21. The network traffic management system of claim 19, wherein:

byte ranges of at least a subset of the requests at least partially overlap; and the one or more processors are further configured to be capable of executing the stored programmed instructions to output at least partially overlapping byte ranges included in each first received one of the responses to one of the subset of the requests.

22. The network traffic management system of claim 19, wherein the one or more processors are further configured to be capable of executing the stored programmed instructions to:

determine when one or more threshold conditions are satisfied wherein the threshold conditions are selected from whether the requested content is larger than a specified length, when a file type of the requested content matches one or more specified file types, or when at least a portion of a path specified in the request for content matches one or more specified paths; and output the requests only when the determining indicates that the one or more threshold conditions are satisfied.

23. The network traffic management system of claim 19, wherein the first or second performance level is based on a geographic location of the one or more servers, a type or speed or hardware or one or more storage devices of the one or more servers, a static or dynamic categorization or profile of one or more capabilities of one or more of the servers.

24. The network traffic management system of claim 19, wherein the second of the different portions is located at a different byte range of the content than the first of the different portions.

* * * * *